(12) United States Patent
Lee et al.

(10) Patent No.: US 9,354,468 B2
(45) Date of Patent: May 31, 2016

(54) LIQUID CRYSTAL DISPLAY AND MANUFACTURING METHOD THEREOF

(71) Applicant: Samsung Display Co., Ltd., Yongin (KR)

(72) Inventors: Sang Hwan Lee, Asan-si (KR); Young Dae Song, Busan (KR); Jae-Hwan Jeon, Seoul (KR); Yong Woo Kim, Seoul (KR); Sung-Dong Park, Asan-si (KR); Hyeok-Tae Kwon, Yongin-si (KR); Joo-Yeon Won, Seoul (KR); Chong Guk Lee, Seoul (KR); Byung Goo Jung, Goyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/522,191

(22) Filed: Oct. 23, 2014

(65) Prior Publication Data

US 2015/0124180 A1 May 7, 2015

(30) Foreign Application Priority Data

Nov. 6, 2013 (KR) .......................... 10-2013-0134392

(51) Int. Cl.
*G02F 1/1333* (2006.01)
*G02F 1/1335* (2006.01)

(52) U.S. Cl.
CPC .... *G02F 1/133528* (2013.01); *G02F 1/133308* (2013.01); *G02F 2001/133317* (2013.01); *G02F 2001/133374* (2013.01); *G02F 2202/28* (2013.01)

(58) Field of Classification Search
CPC ............... G02F 1/133308; G02F 1/133609; G02F 1/13452; G02F 1/133615; G02F 2001/133317

USPC ...................................... 349/58–60
See application file for complete search history.

(56) References Cited

U.S. PATENT DOCUMENTS

| 7,924,362 | B2 | 4/2011 | Slobodin |
| 8,264,135 | B2 | 9/2012 | Ozolins et al. |
| 8,330,734 | B2 | 12/2012 | Oohira |
| 8,432,678 | B2 | 4/2013 | McClure et al. |
| 2008/0088765 | A1* | 4/2008 | Hashimoto ........... G02F 1/1333 349/58 |
| 2009/0262277 | A1* | 10/2009 | Kim ................. G02F 1/133308 349/58 |
| 2010/0271329 | A1 | 10/2010 | Oohira |

(Continued)

FOREIGN PATENT DOCUMENTS

| JP | 2002-182852 | 6/2002 |
| JP | 3879454 | 2/2007 |
| JP | 2007-065855 | 3/2007 |
| JP | 2010-122242 | 6/2010 |
| JP | 5182438 | 4/2013 |
| KR | 10-2008-0068166 | 7/2008 |

(Continued)

*Primary Examiner* — Anne Hines
*Assistant Examiner* — Jose M Diaz
(74) *Attorney, Agent, or Firm* — H.C. Park & Associates, PLC

(57) ABSTRACT

A liquid crystal display according to an exemplary embodiment of the present invention includes a first display panel and a second display panel which are opposite to each other, a driving unit connection line which is formed in the first display panel, a driving circuit portion which is connected to the driving unit connection line, a backlight unit which is disposed so as to be adjacent to the first display panel, a polarizer which is disposed on a surface of the second display panel and overlaps the driving unit connection line and the driving circuit portion, and a reinforcement unit that overlaps the driving unit connection line, and the polarizer may be disposed on the reinforcement unit.

25 Claims, 33 Drawing Sheets

(56) References Cited

U.S. PATENT DOCUMENTS

| | | |
|---|---|---|
| 2010/0321318 A1 | 12/2010 | Oohira |
| 2011/0090630 A1 | 4/2011 | Bergeron et al. |
| 2012/0106063 A1 | 5/2012 | Mathew et al. |
| 2012/0127091 A1 | 5/2012 | Kim et al. |
| 2012/0262907 A1 | 10/2012 | Lee et al. |
| 2012/0281381 A1 | 11/2012 | Sanford et al. |
| 2012/0281383 A1 | 11/2012 | Hwang et al. |
| 2013/0010413 A1 | 1/2013 | Kim et al. |
| 2014/0124121 A1 * | 5/2014 | Wang .................. G06F 3/041 156/64 |

FOREIGN PATENT DOCUMENTS

| | | |
|---|---|---|
| KR | 10-2008-0093724 | 10/2008 |
| KR | 10-2009-0115779 | 11/2009 |
| KR | 10-2010-0062589 | 6/2010 |
| KR | 10-2011-0064287 | 6/2011 |
| KR | 10-2011-0100102 | 9/2011 |
| KR | 10-2012-0005872 | 1/2012 |
| KR | 10-2012-0126993 | 11/2012 |
| KR | 10-2013-0003742 | 1/2013 |
| KR | 10-2013-0035094 | 4/2013 |

* cited by examiner

400

500

LIQUID CRYSTAL DISPLAY AND MANUFACTURING METHOD THEREOF

CROSS REFERENCE TO RELATED APPLICATION

This application claims priority from and the benefit of Korean Patent Application No. 10-2013-0134392, filed on Nov. 6, 2013, which is hereby incorporated by reference for all purposes as if fully set forth herein.

BACKGROUND

1. Field

Exemplary embodiments of the present invention relate to a liquid crystal display and a manufacturing method thereof.

2. Discussion of the Background

The liquid crystal display is a type of flat panel display which has been widely used in recent years. The liquid crystal display typically includes two display panels in which field generating electrodes, such as a pixel electrode and a common electrode, are formed, and a liquid crystal layer is disposed between the two display panels. In the liquid crystal display, a voltage may be applied to the field generating electrode in order to generate an electric field in the liquid crystal layer. The electric field determines alignment of liquid crystal molecules in the liquid crystal layer, and thereby controls the polarization of incident light to display an image.

The liquid crystal display is not a self-emitting display device and utilizes a light source, such as a backlight, to supply light to a liquid crystal layer.

Generally, the liquid crystal display is assembled such that a bottom chassis is used to support a backlight assembly and a liquid crystal panel is disposed on the backlight assembly. The liquid crystal panel is coupled to the backlight assembly using a top chassis, and a tempered glass is attached on the top surface of the top chassis using an adhesive. In this case, the top surface of the top chassis encloses an edge of the liquid crystal panel.

Recently, a demand has formed for a large size liquid crystal display having a reduced thickness. A liquid crystal display typically includes a bezel portion formed in the bottom chassis and the top chassis and disposed at the edge of the liquid crystal panel. Liquid crystal displays have been developed in which the bezel portion is narrow, or the bottom chassis and the top chassis are not provided, so that the bezel portion is not visible to a user.

However, a substrate on which no driving unit connection line is disposed between two opposite substrates is partially removed from an edge. Thus, the driving unit connection line is typically connected to an external driving circuit portion which transmits a driving signal to the liquid crystal panel. The driving unit connection line is disposed among the edges of the liquid crystal panel, so that the driving unit connection line is exposed.

In this case, in order to compensate a height difference caused when one of two opposite substrates is removed, an edge in which the driving unit connection line is disposed among the edges of the display panel needs to include a chassis unit.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a liquid crystal display in which a chassis unit is omitted from a portion corresponding to an edge in which a driving unit connection line, which connects an external driving circuit portion and a liquid crystal panel, is disposed so that a bezel portion is not visible to a user, and a manufacturing method thereof.

Additional features of the invention will be set forth in the description which follows, and in part will be apparent from the description, or may be learned by practice of the invention.

An exemplary embodiment of the present invention provides a liquid crystal display, including: a first display panel and a second display panel which are opposite to each other; a driving unit connection line which is formed in the first display panel; a driving circuit portion which is connected to the driving unit connection line; a backlight unit which is disposed so as to be adjacent to the first display panel; and a polarizer which is disposed on a surface of the second display panel and overlaps the driving unit connection line and the driving circuit portion.

Another exemplary embodiment of the present invention provides a liquid crystal display including: a first display panel and a second display panel which are opposite to each other; a driving unit connection line which is formed in the first display panel; a driving circuit portion which is connected to the driving unit connection line; a backlight unit which is disposed so as to be adjacent to the second display panel; and a polarizer which is disposed on a surface of the first display panel and overlaps the driving unit connection line and the driving circuit portion.

Yet another exemplary embodiment of the present invention provides a manufacturing method of a liquid crystal display including: forming a first display panel including a signal line formed in a pixel region, a driving unit connection line connected to the signal line, and a driving circuit portion connected to the driving unit connection line, and a second display panel disposed opposite to the first display panel; forming a first polarizer on a surface of the first display panel; coupling the first display panel and a backlight unit to each other; washing the second display panel; and forming a second polarizer on the second display panel, in which the second polarizer is formed so as to overlap the driving unit connection line and the driving circuit portion.

According to the liquid crystal display and the manufacturing method thereof, no chassis unit is provided in a portion corresponding to an edge where the driving unit connection line which connects an external driving circuit portion and the liquid crystal panel is disposed so that the bezel portion may not be visible to the user at four edges of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
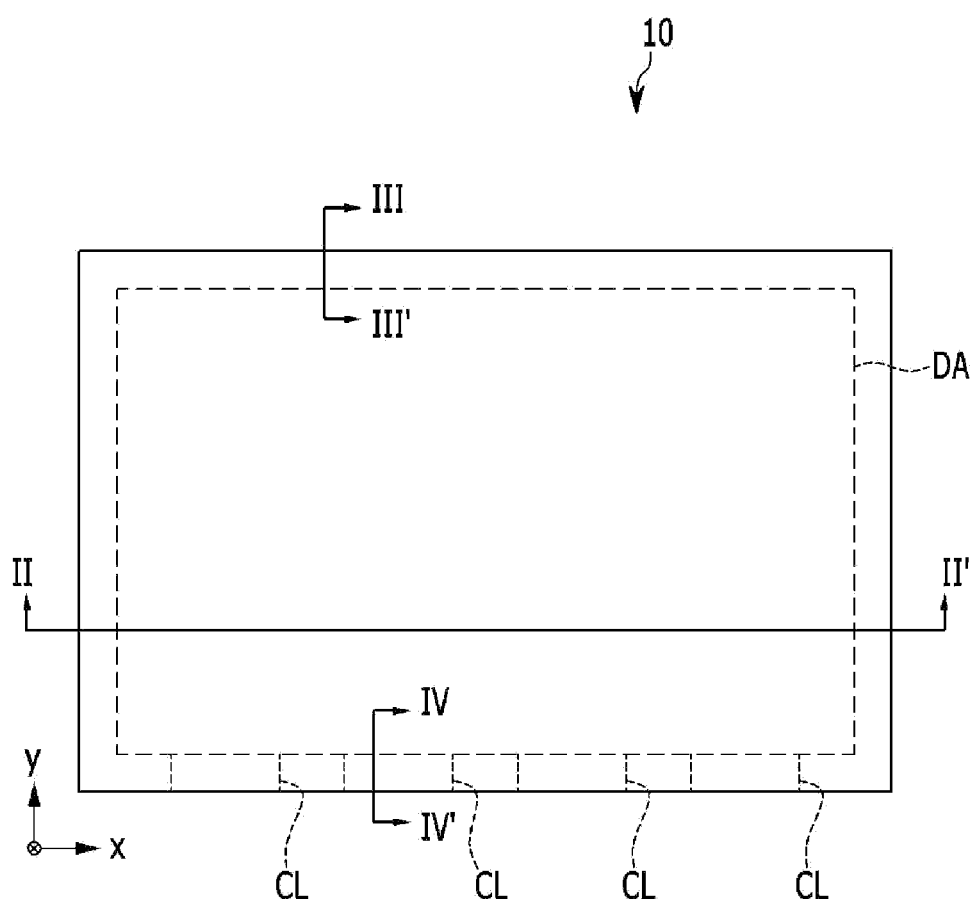
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on the other element or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
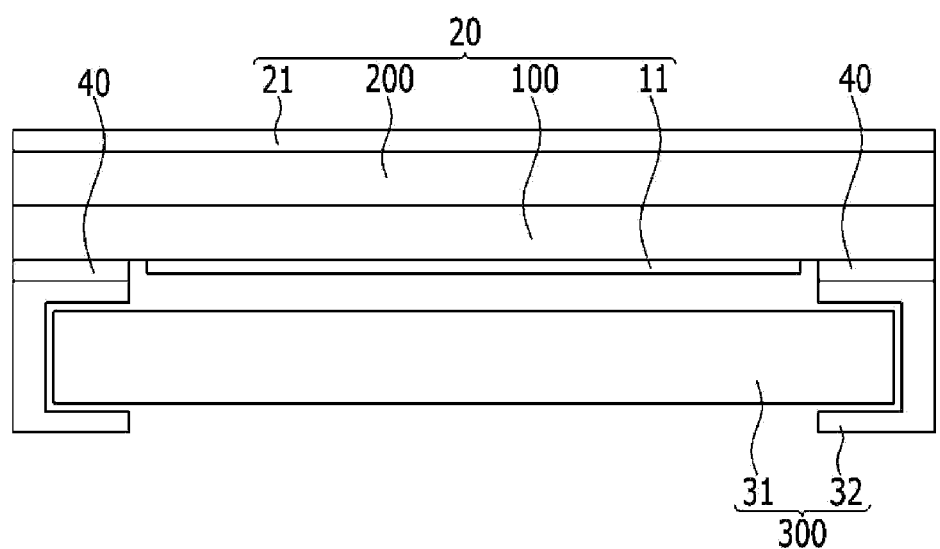
FIG. 2 is a cross-sectional view of the liquid crystal display of FIG. 1 taken along the line II-II'.
Figure 3:
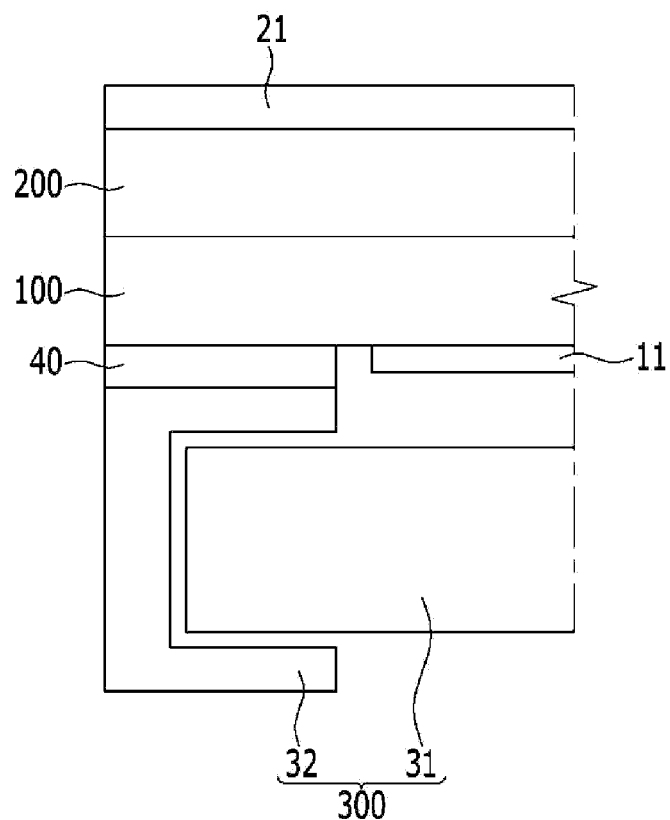
FIG. 3 is a cross-sectional view of the liquid crystal display of FIG. 1 taken along the line III-III'.
Figure 4:
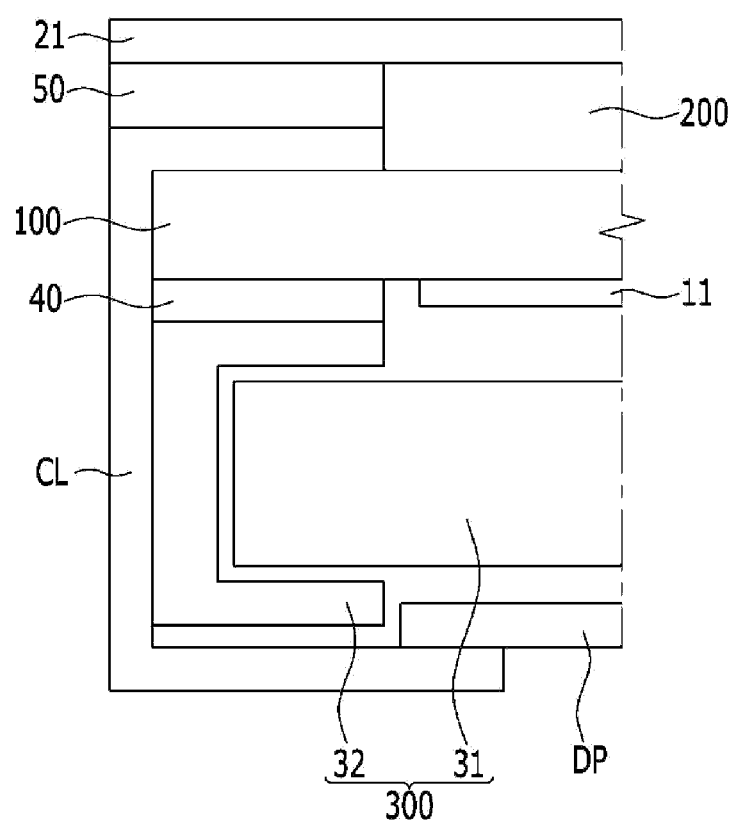
FIG. 4 is a cross-sectional view of the liquid crystal display of FIG. 1 taken along the line IV-IV'.

A liquid crystal display according to an exemplary embodiment of the present invention will be described with reference to FIGS. 1 to 4. FIG. 1 is a layout view of a liquid crystal display according to an exemplary embodiment of the present invention. FIG. 2 is a cross-sectional view of the liquid crystal display of FIG. 1 taken along the line II-II'. FIG. 3 is a cross-sectional view of the liquid crystal display of FIG. 1 taken along the line III-III'. FIG. 4 is a cross-sectional view of the liquid crystal display of FIG. 1 taken along the line IV-IV'.

Referring to FIGS. 1 to 4, a liquid crystal display 10 includes a liquid crystal panel 20. The liquid crystal panel 20 includes a first display panel 100 and a second display panel 200, which are disposed opposite to each other and coupled to each other, a first polarizer 11, which is disposed on the first display panel 100 and a second polarizer 21, which is disposed on the second display panel 200, and a backlight unit 300 which is disposed on one surface of the liquid crystal panel 20.

The backlight unit 300 includes a backlight assembly 31 and a mold frame 32, which holds the backlight assembly 31 in place. The liquid crystal panel 20 and the backlight unit 300 are coupled to each other by an adhesive unit 40.

Referring to FIGS. 1 and 2, the liquid crystal panel 20 includes the first display panel 100 and the second display panel 200 which are disposed facing each other and are coupled to each other. The liquid crystal panel 20 includes a display area DA, in which a plurality of pixels are formed to display an image.

Referring to FIGS. 1, 2, and 3, the second polarizer 21 extends to the ends of both edges of the liquid crystal panel 20 in an X direction, and extends to the end of an upper edge of the liquid crystal panel 20 in a Y direction. That is, the second polarizer 21 extends to the mold frame 32 of the backlight unit 300 and has a portion that overlaps the adhesive unit 40.

Referring to FIGS. 1 and 4, a driving unit connection line CL is formed at a lower edge of the first display panel 100 in the Y direction, and the external driving circuit portion DP, which is connected to the driving unit connection line CL, is disposed at a back of the backlight unit 300.

The first polarizer 11, which is attached to the first display panel 100 and therefore adjacent to the backlight unit 300, is not disposed in a region where the adhesive unit 40 is disposed. In contrast, the second polarizer 21, which is disposed on the second display panel 200, is formed in a region that overlaps the adhesive unit 40. Further, the second polarizer 21 is also formed in a region that overlaps the driving unit connection line CL.

The second display panel 200 does not overlap an edge of the first display panel 100 in which the driving unit connection line CL is formed. That is, in the Y direction, a width of the second display panel 200 is smaller than a width of the first display panel 100 and the second display panel 200 is formed so as not to overlap the area near the edge of the first display panel 100 in which the driving unit connection line CL is formed. The edge of the first display panel 100 is exposed and at least a portion of the driving unit connection line CL of the first display panel 100 is exposed through the edge.

A reinforcement unit 50 is disposed at the same edge through which the driving unit connection line CL of the first display panel 100 is exposed. At the same edge, the second polarizer 21 is disposed on the second display panel 200 and the reinforcement unit 50.

The reinforcement unit 50 compensates for the difference in heights of the portion through which the driving unit connection line CL of the first display panel 100 is exposed and other portions. In this manner, the reinforcement unit 50 is coupled to the second polarizer 21 in an area that is not only in the display area DA of the liquid crystal display 10 but also on a front surface of the liquid crystal display 10. That is, the reinforcement unit 50 is formed on a portion of the first display panel 100 which does not overlap the second display panel 200 so that a step between a portion of the first display panel 100 that overlaps the second display panel 200 and the portion which does not overlap the second display panel 200 may be compensated. Accordingly, heights of surfaces of the second display panel 200 and the reinforcement unit 50 may be substantially same, as shown in FIG. 4.

The second polarizer 21 is coupled to the second display panel 200 and the reinforcement unit 50, which have substantially the same height so as to be coupled to the front surface of the liquid crystal display 10.

If the reinforcement unit 50 is not formed, the second polarizer 21 may not be coupled onto the portion which does not overlap the second display panel 200 due to the step between the portion of the first display panel 100 that overlaps the second display panel 200 and the portion of the first display panel 100 which does not overlap the second display panel 200.

However, in the liquid crystal display according to the exemplary embodiment of the present invention, the reinforcement unit 50 is formed on the portion of the first display panel 100 which does not overlap the second display panel 200, that is, the portion through which the driving unit connection line CL is exposed so that the second polarizer 21 may be coupled onto the front surface of the liquid crystal display 10.

As described above, in the liquid crystal display according to the exemplary embodiment of the present invention, a chassis unit is not disposed between the liquid crystal panel 20 and the backlight unit 300 which are in contact with each other.

In the liquid crystal display according to the exemplary embodiment of the present invention, the backlight assembly 31 is fixed by the mold frame 32 and then attached to the liquid crystal panel 20 by an adhesive unit 40. In this configuration, the liquid crystal panel 20 and the backlight unit 300 are attached to each other without using the top chassis at four edges of the liquid crystal display so that the thickness and weight of the liquid crystal display may be reduced and the width of a bezel portion may be reduced.

Further, the second polarizer 21 is formed on the front surface of the liquid crystal display 10 where the driving unit connection line CL and the external driving circuit portion DP overlap, so that the bezel portions are not visible at the four edges of the liquid crystal display by a user.

Figure 5:
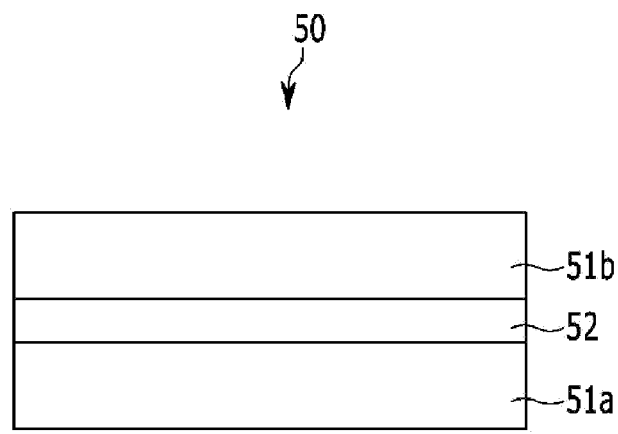
FIG. 5 is a cross-sectional view of a supporting unit according to an exemplary embodiment of the present invention.

Now, an example of a structure of a reinforcement unit 50 of the liquid crystal display according to an exemplary embodiment of the present invention will be described with reference to FIG. 5. FIG. 5 is a cross-sectional view of a supporting unit according to an exemplary embodiment of the present invention.

Referring to FIGS. 4 and 5, the reinforcement unit 50 of the liquid crystal display includes a first layer 51a, a second layer 51b, and an adhesive layer 52 that couples the first layer 51a and the second layer 51b.

The first layer 51a and the second layer 51b may include a synthetic resin such as polyethylene (PET).

At least one of the first layer 51a and the second layer 51b may include an elastic body. At least a portion of the reinforcement unit 50 may include an elastic body so that even though there may be a minute height difference between the surface of the reinforcement unit 50 and the surface of the second display panel 200, the surface of the second polarizer 21 is tightly coupled when the second polarizer 21 is coupled to reinforcement unit 50 and the surface of the second display panel 200.

The reinforcement unit 50 of the liquid crystal display according to the exemplary embodiment illustrated in FIG. 5 has a triple-layered structure which includes the first layer 51a, the second layer 51b, and the adhesive layer 52, which couples the first layer 51a and the second layer 51b. However, a reinforcement unit 50 of a liquid crystal display according to another exemplary embodiment of the present invention may have a single-layered structure, a double-layered structure, or a quadruple or more layered structure.

Figure 6:
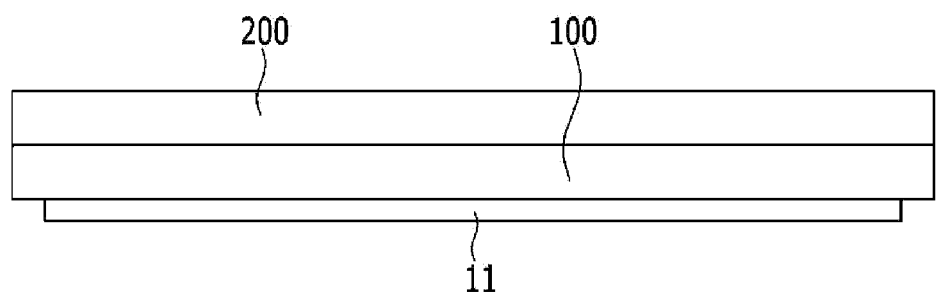
FIGS. 6, 9, and 12 are cross-sectional views sequentially illustrating a manufacturing method of a liquid crystal display according to an exemplary embodiment of the present invention, taken along the line II-II' of FIG. 1.
Figure 7:
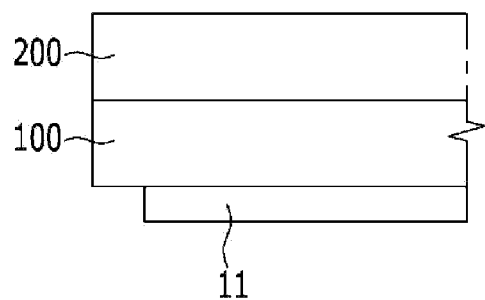
FIGS. 7, 10, and 13 are cross-sectional views sequentially illustrating a manufacturing method of a liquid crystal display according to an exemplary embodiment of the present invention, taken along the line III-III' of FIG. 1.
Figure 8:
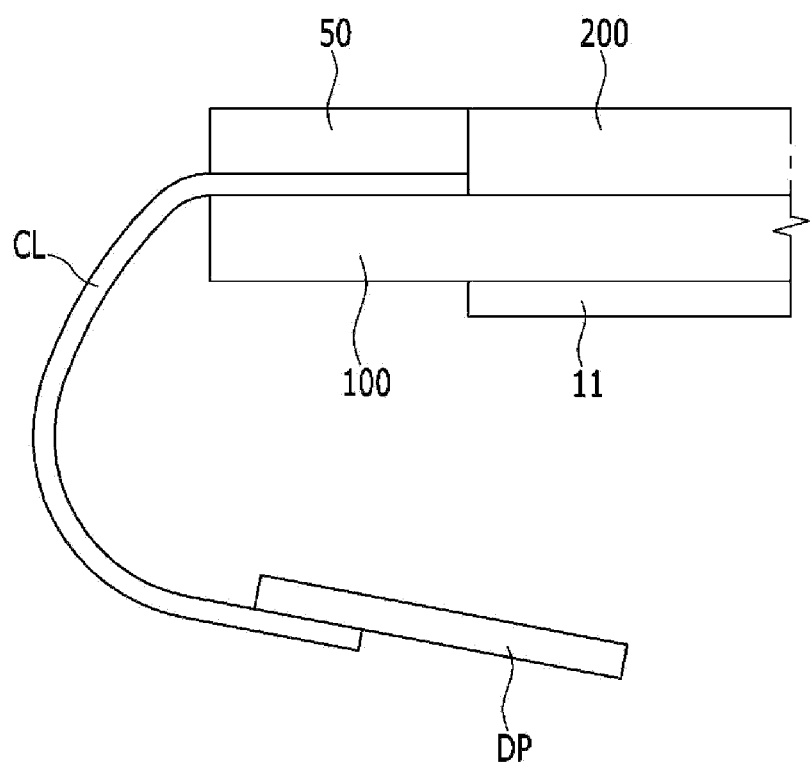
FIGS. 8, 11, and 14 are cross-sectional views sequentially illustrating a manufacturing method of a liquid crystal display according to an exemplary embodiment of the present invention, taken along the line IV-IV' of FIG. 1.
Figure 9:
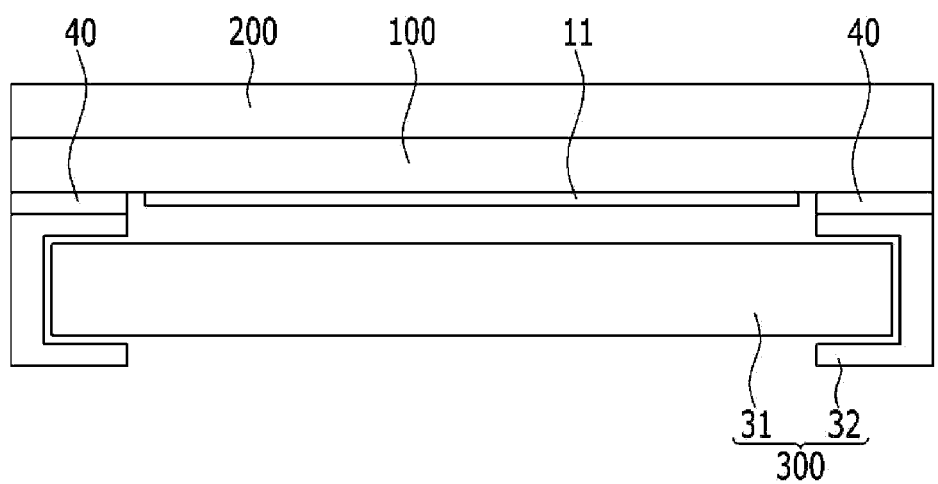
Figure 10:
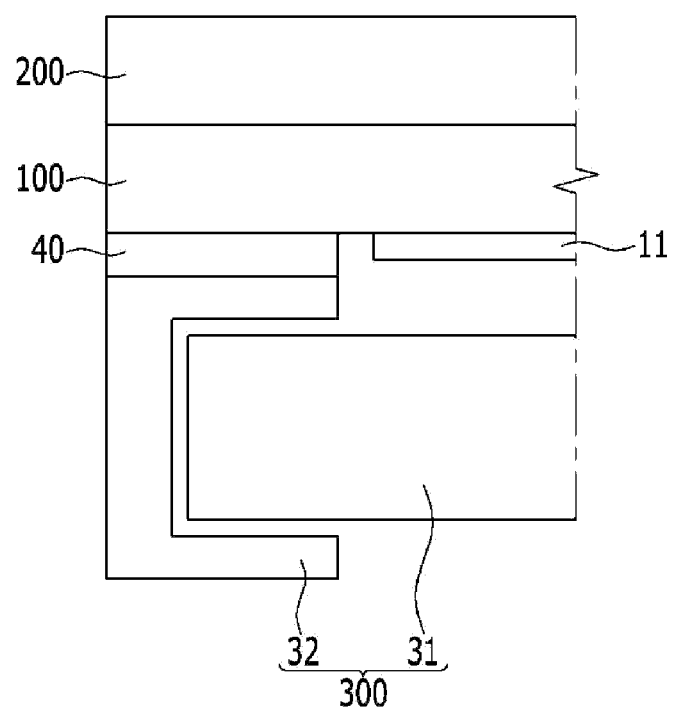
Figure 11:
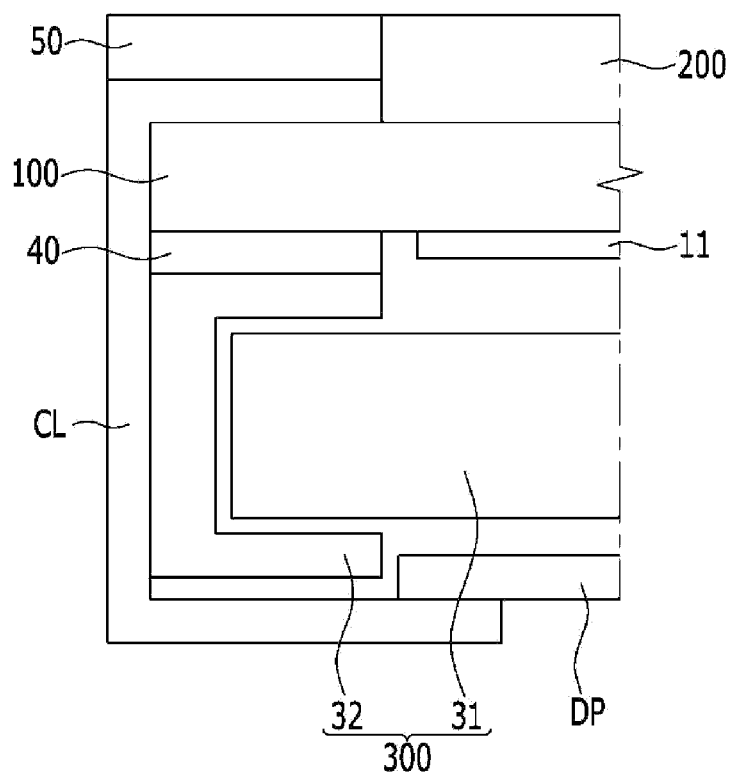
Figure 12:
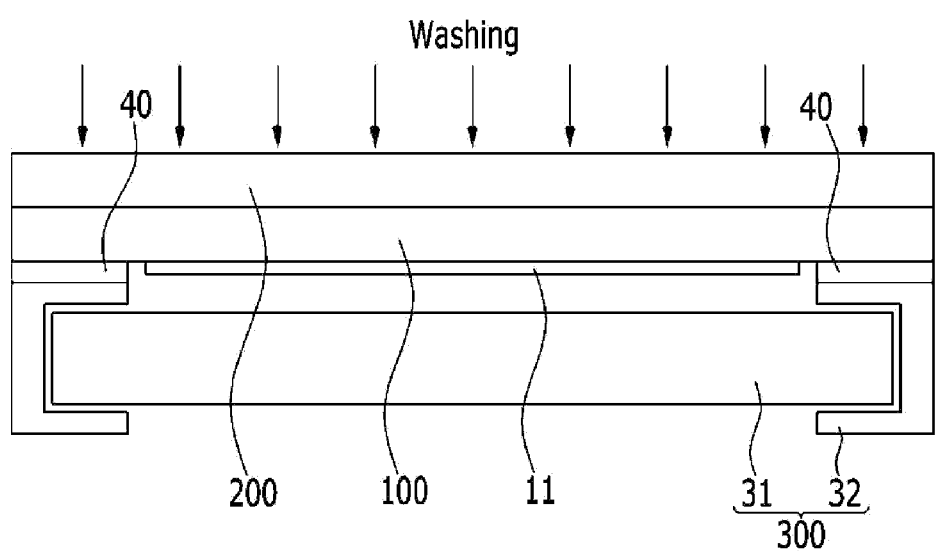
Figure 13:
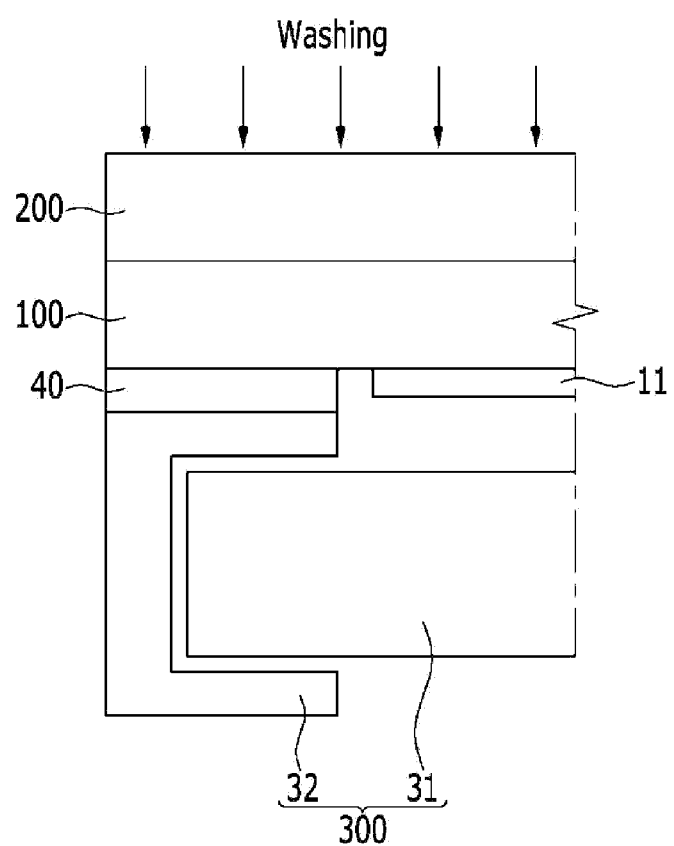
Figure 14:
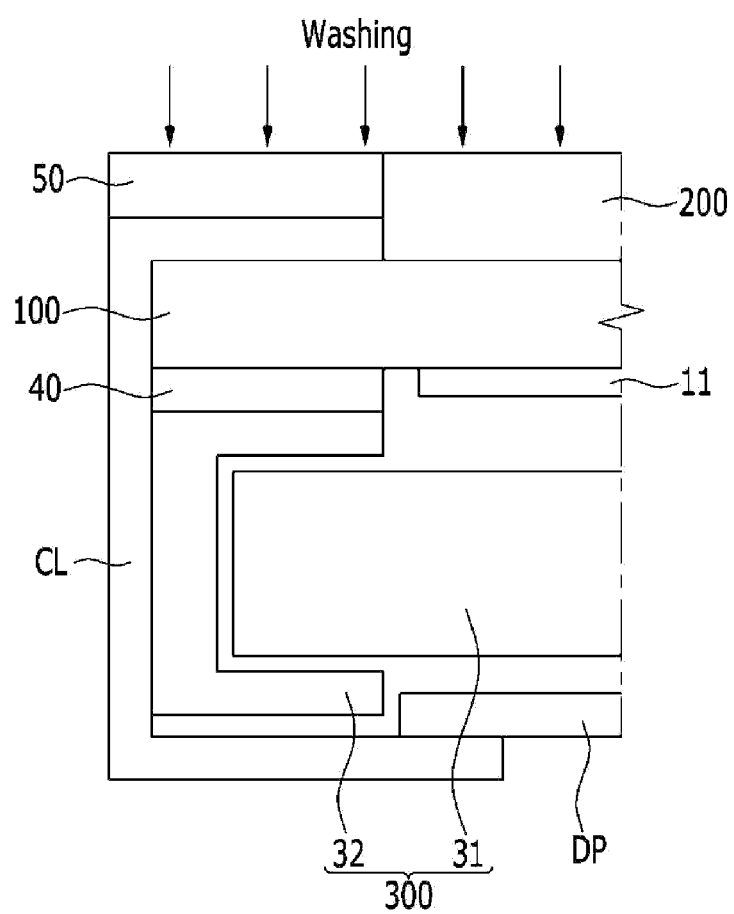

A manufacturing method of a liquid crystal display according to an exemplary embodiment of the present invention will be described with reference to FIGS. 1 to 4, and 6 to 14. FIGS. 6, 9, and 12 are cross-sectional views sequentially illustrating a manufacturing method of a liquid crystal display according to an exemplary embodiment of the present invention, taken along the line II-II' of FIG. 1. FIGS. 7, 10, and 13 are cross-sectional views sequentially illustrating a manufacturing method of a liquid crystal display according to an exemplary embodiment of the present invention, taken along the line III-III' of FIG. 1. FIGS. 8, 11, and 14 are cross-sectional views sequentially illustrating a manufacturing method of a liquid crystal display according to an exemplary embodiment of the present invention, taken along the line IV-IV' of FIG. 1.

First, as illustrated in FIGS. 6 to 8, after forming a first display panel 100, including a driving unit connection line CL, and forming a second display panel 200, the first display panel 100 and the second display panel 200 are disposed so as to be opposite to each other and a liquid crystal layer is disposed therebetween. Thereafter, a first polarizer 11 is coupled onto the first display panel 100. Although it has been described that the first polarizer 11 is coupled after coupling the first display panel 100 and the second display panel 200 to each other, the first polarizer 11 may be coupled to the first display panel 100 after forming the first display panel 100 including the driving unit connection line CL. The second display panel 200 may then be coupled to first display panel 100 according to a manufacturing method of a liquid crystal display according to another exemplary embodiment of the present invention. An external driving circuit portion DP is connected to the driving unit connection line CL of the first display panel 100.

A reinforcement unit 50 is formed on the driving unit connection line CL, which is exposed to the outside through an edge of the first display panel 100.

Thereafter, as illustrated in FIGS. 9 to 11, a backlight unit 300 and the first display panel 100 are attached to each other using an adhesive unit 40. Although it is described that the reinforcement unit 50 is formed before attaching the backlight unit 300 and the first display panel 100 using the adhesive unit 40 according to the present exemplary embodiment, the reinforcement unit 50 may be formed after the step of attaching the backlight unit 300 and the first display panel 100 using the adhesive unit 40 according to another exemplary embodiment of the present invention.

Next, as illustrated in FIGS. 12 to 14, the surfaces of the second display panel 200 and the reinforcement unit 50 are washed.

Finally, as illustrated in FIGS. 1 to 4, the second polarizer 21 is formed on the second display panel 200 and the reinforcement unit 50. Therefore, the second polarizer 21 is formed on the front surface of the liquid crystal display 10.

According to the exemplary embodiment of the present invention, after forming the reinforcement unit 50 in a position that overlaps the driving unit connection line CL, the second polarizer 21 is coupled so that the second polarizer 21 may be formed on the front surface of the liquid crystal display 10, that overlaps the driving unit connection line CL and the external driving circuit portion DP. Therefore, the bezel portion is not visible by the user at the four edges of the liquid crystal display.

Figure 15:
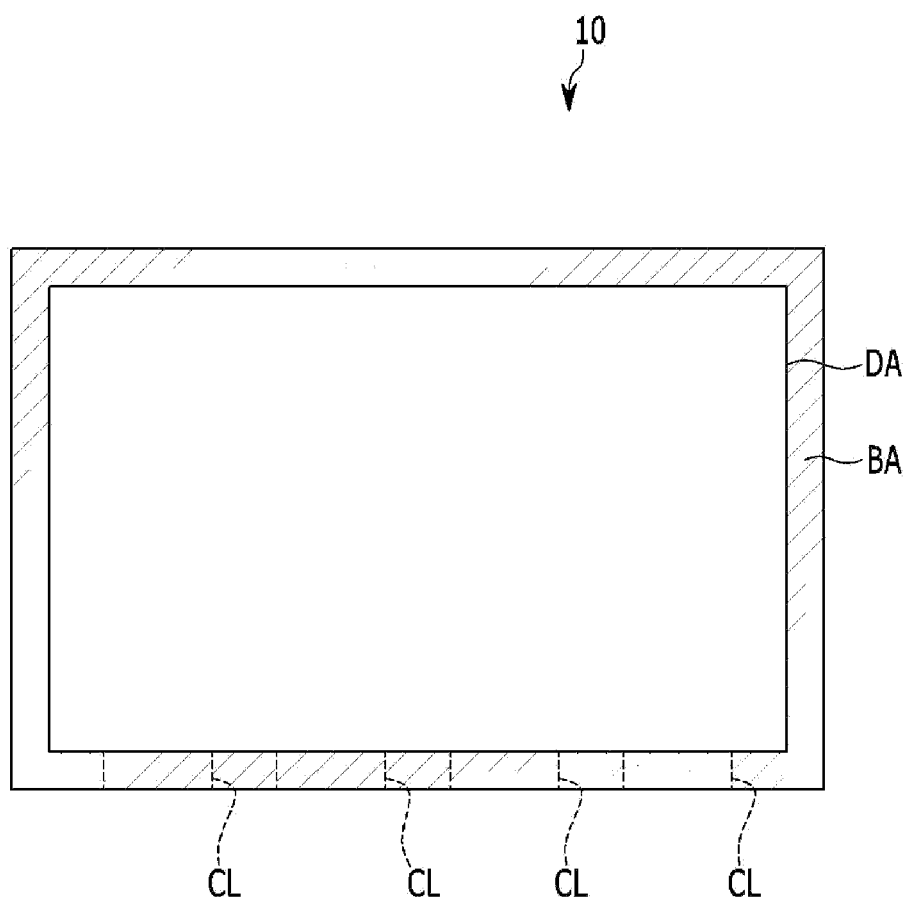
FIG. 15 is a layout view of a liquid crystal display according to another exemplary embodiment of the present invention.

A liquid crystal display according to another exemplary embodiment of the present invention will be described with reference to FIG. 15. FIG. 15 is a layout view of a liquid crystal display according to another exemplary embodiment of the present invention.

Referring to FIG. 15, a liquid crystal display according to the present exemplary embodiment is substantially similar to the liquid crystal display according to the exemplary embodiment illustrated in FIG. 1. Detailed description of the same constituent elements will be omitted.

However, the liquid crystal display according to the present exemplary embodiment further includes a light blocking layer BA formed at an edge of a display area DA of the liquid crystal display. The light blocking layer BA is disposed so as to overlap the adhesive unit 40 and the reinforcement unit 50 illustrated in FIGS. 2 to 4. The light blocking layer BA is formed so that the light leakage which may occur around the display area DA may be prevented.

Figure 16:
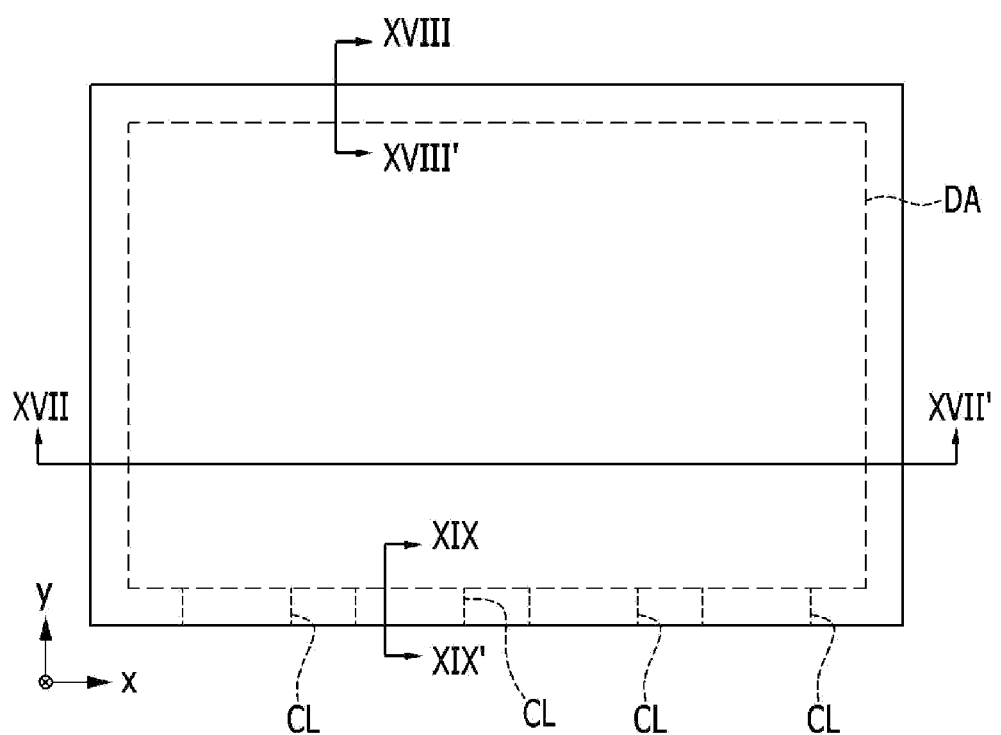
FIG. 16 is a layout view of a liquid crystal display according to another exemplary embodiment of the present invention.
Figure 17:
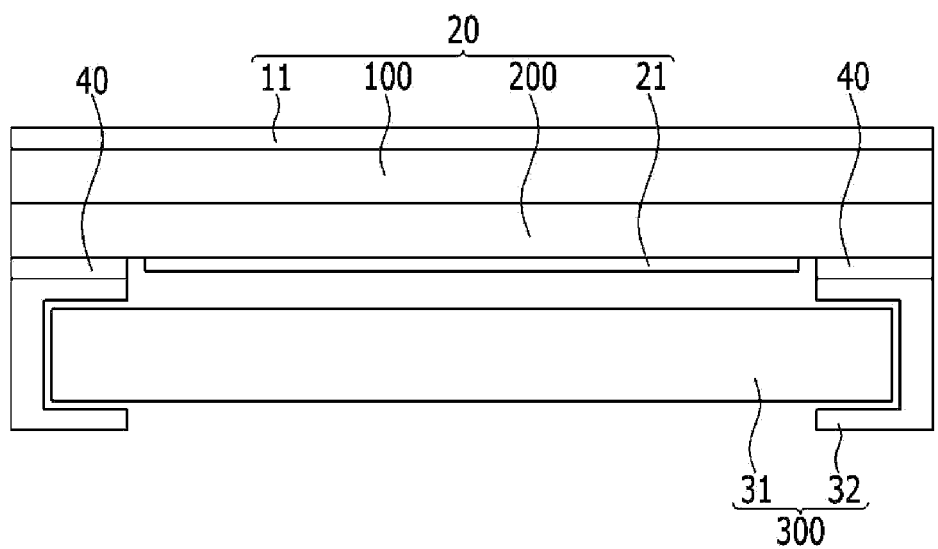
FIG. 17 is a cross-sectional view illustrating the liquid crystal display of FIG. 16 taken along the line XVII-XVII'.
Figure 18:
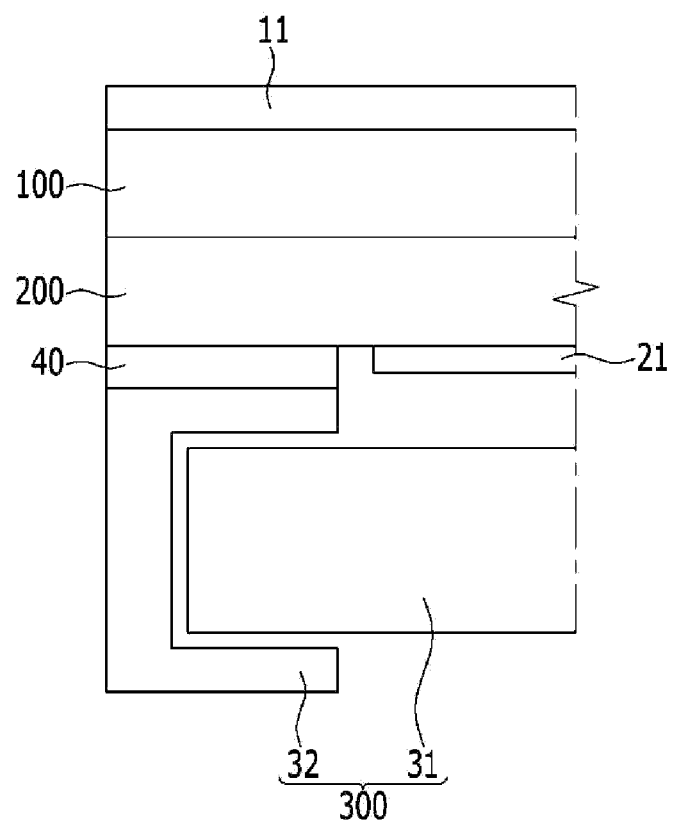
FIG. 18 is a cross-sectional view illustrating the liquid crystal display of FIG. 16 taken along the line XVIII-XVIII'.
Figure 19:
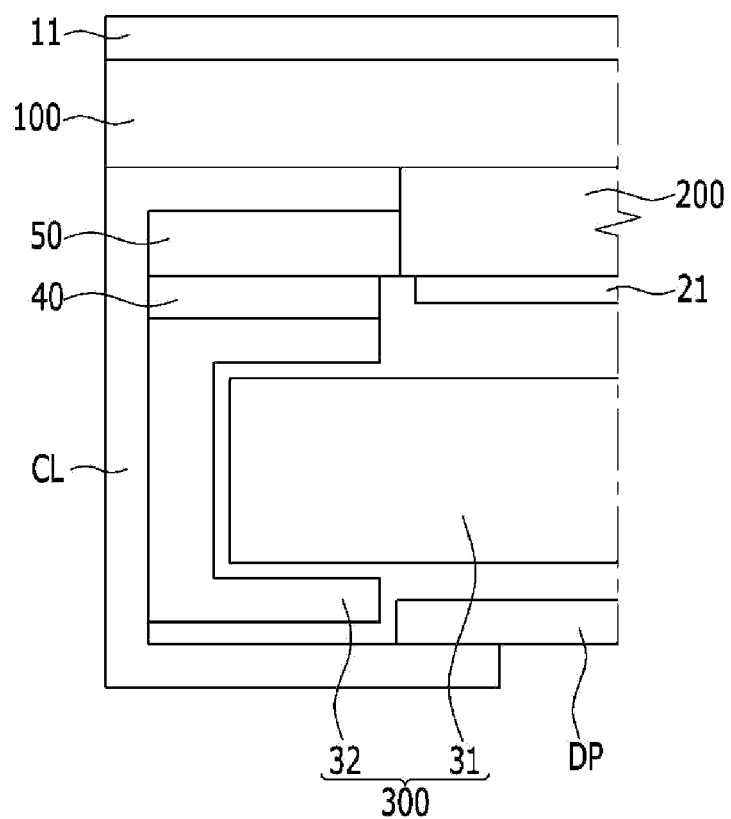
FIG. 19 is a cross-sectional view illustrating the liquid crystal display of FIG. 16 taken along the line XIX-XIX'.

A liquid crystal display according to another exemplary embodiment of the present invention will be described with reference to FIGS. 16 to 19. FIG. 16 is a layout view of a liquid crystal display according to another exemplary embodiment of the present invention. FIG. 17 is a cross-sectional view illustrating the liquid crystal display of FIG. 16 taken along the line XVII-XVII'. FIG. 18 is a cross-sectional view illustrating the liquid crystal display of FIG. 16 taken along the line XVIII-XVIII'. FIG. 19 is a cross-sectional view illustrating the liquid crystal display of FIG. 16 taken along the line XIX-XIX'.

Referring to FIGS. 16 to 19, a liquid crystal display 10 according to another exemplary embodiment of the present invention includes a liquid crystal panel 20, which includes a first display panel 100 and a second display panel 200 disposed facing each other and are coupled to each other, a first polarizer 11 coupled on the first display panel 100, and a second polarizer 21 disposed on the second display panel 200, and a backlight unit 300 disposed on one surface of the liquid crystal panel 20.

The backlight unit 300 includes a backlight assembly 31 and a mold frame 32 which fixes the backlight assembly 31. The liquid crystal panel 20 and the backlight unit 300 are coupled to each other by an adhesive unit 40.

Now, individual constituent elements will be described in detail. Referring to FIGS. 17 to 19, the liquid crystal panel 20 includes the first display panel 100 and the second display panel 200, which are opposite to each other and coupled to each other. The liquid crystal panel 20 includes a display area DA in which a plurality of pixels are formed to display an image.

Referring to FIGS. 17 to 19, in the liquid crystal display according to the present exemplary embodiment, the second display panel 200 of the liquid crystal panel 20 is disposed adjacent to the backlight unit 300, which is different from the liquid crystal display of the exemplary embodiment illustrated in FIGS. 1 to 4. That is, an arrangement of the first display panel 100 and the second display panel 200 is opposite to an arrangement of the first display panel 100 and the second display panel 200 according to the exemplary embodiment illustrated in FIGS. 1 to 4, with respect to the backlight unit 300.

The first polarizer 11 extends to both edges of the liquid crystal panel 20 in an X direction and extends to an end of an upper edge of the liquid crystal panel 20 in a Y direction. That is, the first polarizer 11 extends to the mold frame 32 of the backlight unit 300 and has a portion that overlaps the adhesive unit 40.

A driving unit connection line CL is formed at a lower edge of the first display panel 100 of the liquid crystal panel 20 in the Y direction and the external driving circuit portion DP, which is connected to the driving unit connection line CL, is disposed at a back of the backlight unit 300.

The second polarizer 21, which is disposed on the second display panel 200, is disposed between the display panels 100 and 200 of the liquid crystal panel 20, but is not disposed in a region where the adhesive unit 40 is disposed. In contrast, the first polarizer 11 which is disposed on the first display panel 100 is formed in a region that overlaps the adhesive unit 40. Further, the first polarizer 11 is also formed in a region that overlaps the driving unit connection line CL.

The second display panel 200 does not overlap the edge of the first display panel 100 where the driving unit connection line CL is formed. That is, the width of the second display panel 200 is smaller than the width of the first display panel 100 in the Y direction, and the second display panel 200 does not overlap an area near the edge of the first display panel 100 in which the driving unit connection line CL is formed. The edge of the first display panel 100 is exposed and the driving unit connection line CL of the first display panel 100 is exposed through the edge.

A reinforcement unit 50 is disposed at the edge through which the driving unit connection line CL of the first display panel 100 is exposed.

As described above, the reinforcement unit 50 which compensates the difference of heights of the portion through which the driving unit connection line CL of the first display panel 100 is exposed and other portions is formed so that a constant interval between the liquid crystal panel 20 and the backlight unit 300 may be maintained.

In the liquid crystal display according to the exemplary embodiment of the present invention, the backlight assembly 31 is fixed by the mold frame 32 and then coupled to the liquid crystal panel 20 by an adhesive unit 40, so that the liquid crystal panel 20 and the backlight unit 300 are coupled to each other without using the top chassis at four edges of the liquid crystal display. Because of this configuration, the thickness and the weight of the liquid crystal display may be reduced, and the width of a bezel portion may be reduced.

Further, the first polarizer 11 is formed on the front surface of the liquid crystal display in an area where the driving unit connection line CL and the external driving circuit portion DP overlap so that the bezel portions are not visible at the four edges of the liquid crystal display by a user.

Figure 20:
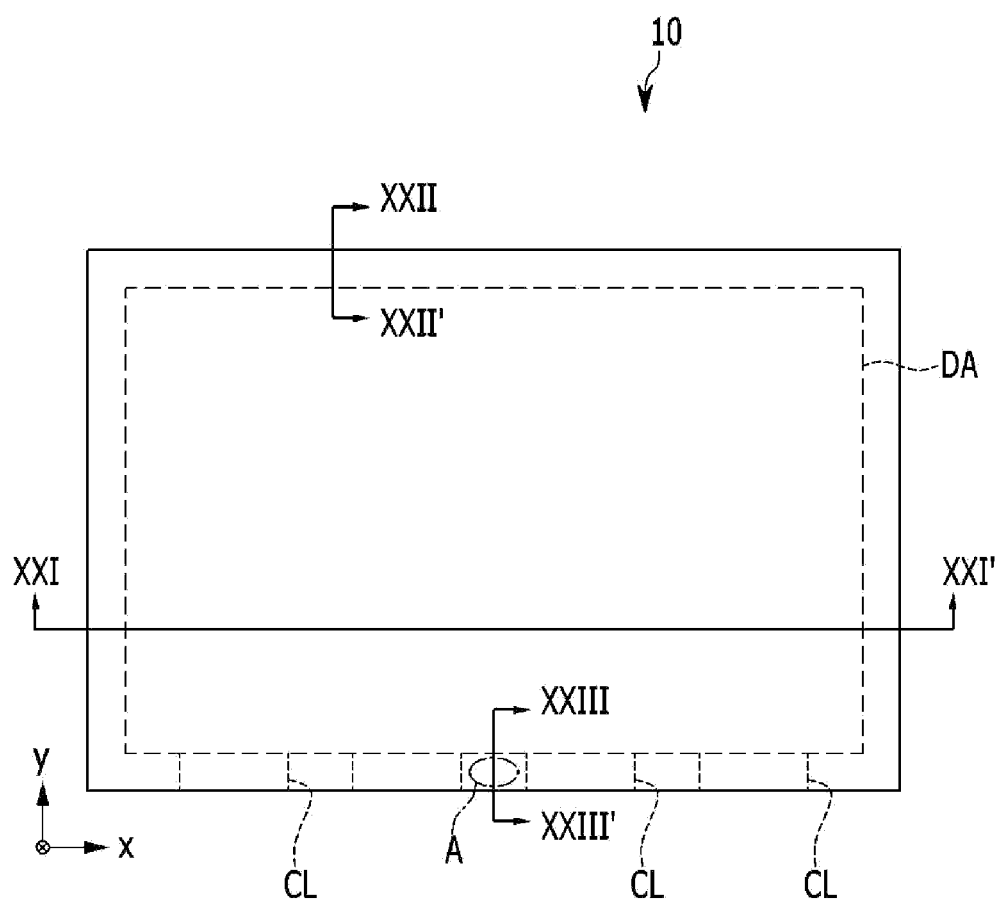
FIG. 20 is a layout view of a liquid crystal display according to another exemplary embodiment of the present invention.
Figure 21:
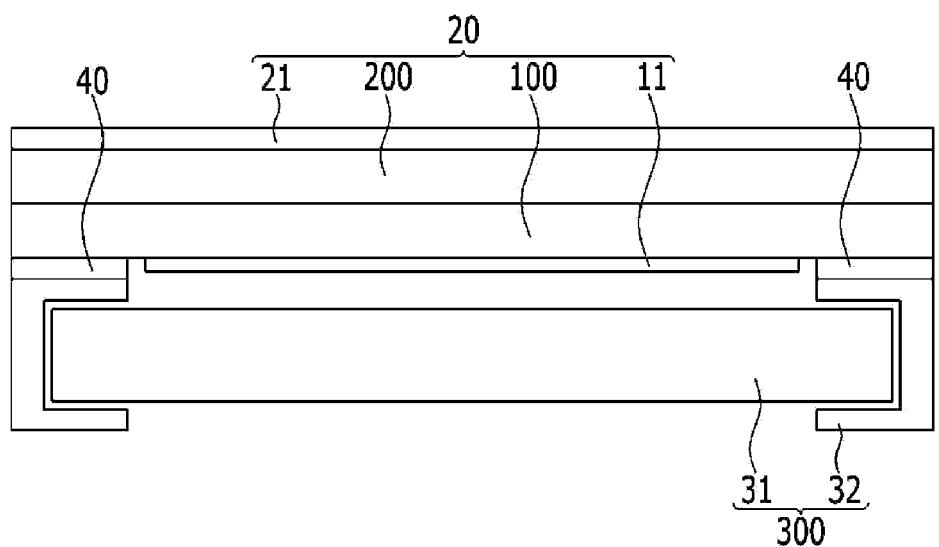
FIG. 21 is a cross-sectional view illustrating the liquid crystal display of FIG. 20 taken along the line XXI-XXI'.
Figure 22:
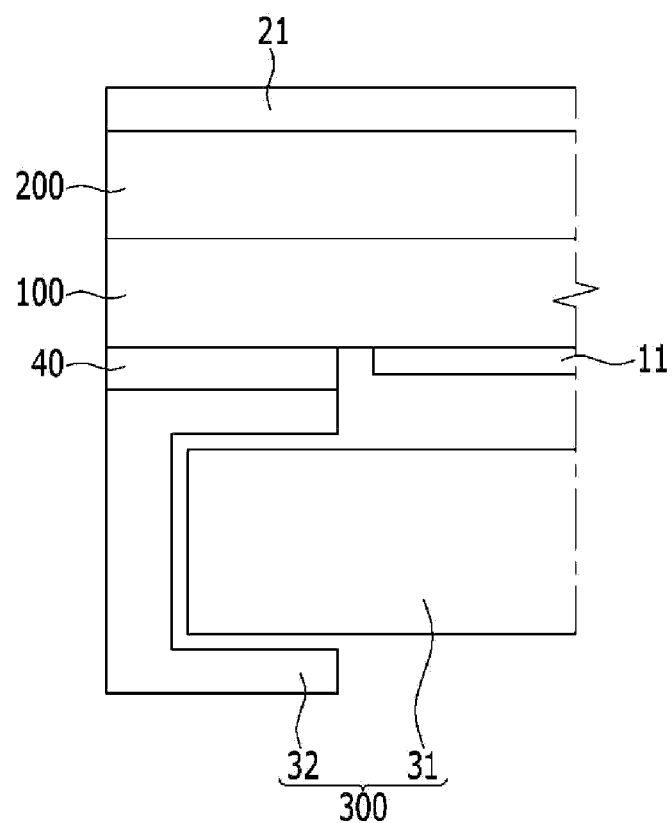
FIG. 22 is a cross-sectional view illustrating the liquid crystal display of FIG. 20 taken along the line XXII-XXII'.
Figure 23:
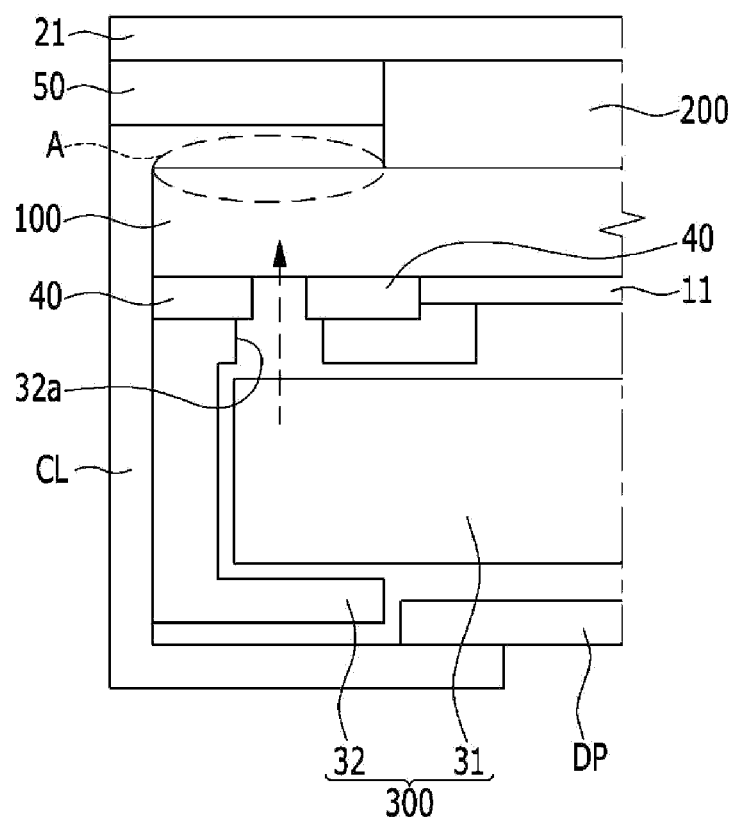
FIG. 23 is a cross-sectional view illustrating the liquid crystal display of FIG. 20 taken along the line XXIII-XXIII'.
Figure 24:
FIG. 24 is a diagram partially illustrating the liquid crystal display of FIG. 20.

A liquid crystal display according to an exemplary embodiment of the present invention will be described with reference to FIGS. 20 to 24. FIG. 20 is a layout view of a liquid crystal display according to another exemplary embodiment of the present invention. FIG. 21 is a cross-sectional view illustrating the liquid crystal display of FIG. 20 taken along the line XXI-XXI'. FIG. 22 is a cross-sectional view illustrating the liquid crystal display of FIG. 20 taken along the line XXII-XXII'. FIG. 23 is a cross-sectional view illustrating the liquid crystal display of FIG. 20 taken along the line XXIII-XXIII'. FIG. 24 is a diagram partially illustrating the liquid crystal display of FIG. 20.

Referring to FIGS. 20 to 23, a liquid crystal display 10 according to an exemplary embodiment of the present invention is similar to the liquid crystal display according to the exemplary embodiment illustrated with reference to FIGS. 1 to 4. Detailed description of the same constituent elements will be omitted.

Referring to FIGS. 20 and 21, a liquid crystal panel 20 includes a first display panel 100 and a second display panel 200 which are disposed facing each other and coupled to each other. The liquid crystal panel 20 includes a display area DA in which a plurality of pixels is formed to display an image.

Referring to FIGS. 20, 21, and 22, a second polarizer 21 extends to the ends of both edges of the liquid crystal panel 20 in an X direction and extends to an end of an upper edge of the liquid crystal panel 20 in a Y direction. That is, the second polarizer 21 extends to the mold frame 32 of the backlight unit 300, and has a portion that overlaps the adhesive unit 40.

Referring to FIG. 23, a driving unit connection line CL is formed at a lower edge of the first display panel 100 of the liquid crystal panel 20 in the Y direction and the external driving circuit portion DP which is connected to the driving unit connection line CL is disposed at a back of the backlight unit 300.

The first polarizer 11, which is coupled to the first display panel 100 which is adjacent to the backlight unit 300, is not disposed in a region where the adhesive unit 40 is disposed. In contrast, the second polarizer 21, which is disposed on the second display panel 200, is formed in a region that overlaps the adhesive unit 40. Further, the second polarizer 21 is also formed in a region that overlaps the driving unit connection line CL.

The second display panel 200 does not overlap the edge of the first display panel 100 in which the driving unit connection line CL is formed. That is, the width of the second display panel 200 is smaller than the width of the first display panel 100 in the Y direction, and the second display panel 200 is formed so as not to overlap an area near the edge of the first display panel 100 where the driving unit connection line CL is formed. The edge of the first display panel 100 is exposed and at least a portion of the driving unit connection line CL of the first display panel 100 is exposed through the edge.

A reinforcement unit 50 is disposed at the edge at which the driving unit connection line CL of the first display panel 100 is exposed and the second polarizer 21 is formed on the second display panel 200 and the reinforcement unit 50.

The reinforcement unit 50 compensates for the difference of heights of the portion through which the driving unit connection line CL of the first display panel 100 is exposed and other portions. In this manner, the second polarizer 21 may be coupled not only in the display area DA of the liquid crystal display 10 but also on the front surface of the liquid crystal display 10. That is, the reinforcement unit 50 is formed on a portion of the first display panel 100 which does not overlap the second display panel 200 so that a step between a portion of the first display panel 100 that overlaps the second display panel 200 and the portion which does not overlap the second display panel 200 may be compensated for. Accordingly, heights of surfaces of the second display panel 200 and the reinforcement unit 50 may be substantially the same.

The second polarizer 21 is coupled to the second display panel 200 and the reinforcement unit 50, which have substantially the same height, and is therefore disposed on the front surface of the liquid crystal display 10.

Referring to FIG. 23, in the liquid crystal display according to the present exemplary embodiment, an opening 32a is formed in a portion of the mold frame 32, which is different from the liquid crystal display according to the exemplary embodiment illustrated in FIGS. 1 to 4. Accordingly, as indicated by an arrow in FIG. 23, a portion of light which is radiated from the backlight assembly 31 is directly transmitted to a first portion A of the first display panel 100 through an opening 32a of the mold frame 32. A portion of the adhesive unit 40 is removed from an area where the opening 32a of the mold frame 32 is formed.

The first portion A of the first display panel 100, on which the portion of light radiated from the backlight assembly 31 is directly transmitted through the opening 32a in the mold frame 32, will be described with reference to FIG. 24.

Referring to FIG. 24, a first display portion 400, which needs to be visible to the user since a brand logo is formed in the first portion A of the first display panel 100. A character and a logo that need to be visible to the user are transparently formed in the first display portion 400 so that the light radiated from the backlight assembly 31 through the opening 32a in the mold frame 32 passes through the character and the logo to be visible to the user. Like the portion which is represented with black color in FIG. 24, a portion of the first display portion 40 may be coated with silver to reflect external light, so as to distinguish the character and the logo in the first display portion 400. As described above, the display portion 400, may be visible using a portion of light of the backlight assembly 31 without using an additional light source.

Further, according to the exemplary embodiment of the present invention, a chassis unit is not disposed between the liquid crystal panel 20 and the backlight unit 300, which are in contact with each other.

In the liquid crystal display according to the exemplary embodiment of the present invention, the backlight assembly 31 is fixed by the mold frame 32 and then coupled to the liquid crystal panel 20 by an adhesive unit 40, so that the liquid crystal panel 20 and the backlight unit 300 are coupled to each other without using the top chassis at four edges of the liquid crystal display. In this manner, the thickness and the weight of the liquid crystal display may be reduced and the width of a bezel portion may be reduced.

Further, the second polarizer 21 is formed on the front surface of the liquid crystal display 10 where the driving unit connection line CL and the external driving circuit portion DP overlap, so that the bezel portions are not visible at four edges of the liquid crystal display by a viewer.

Figure 25:
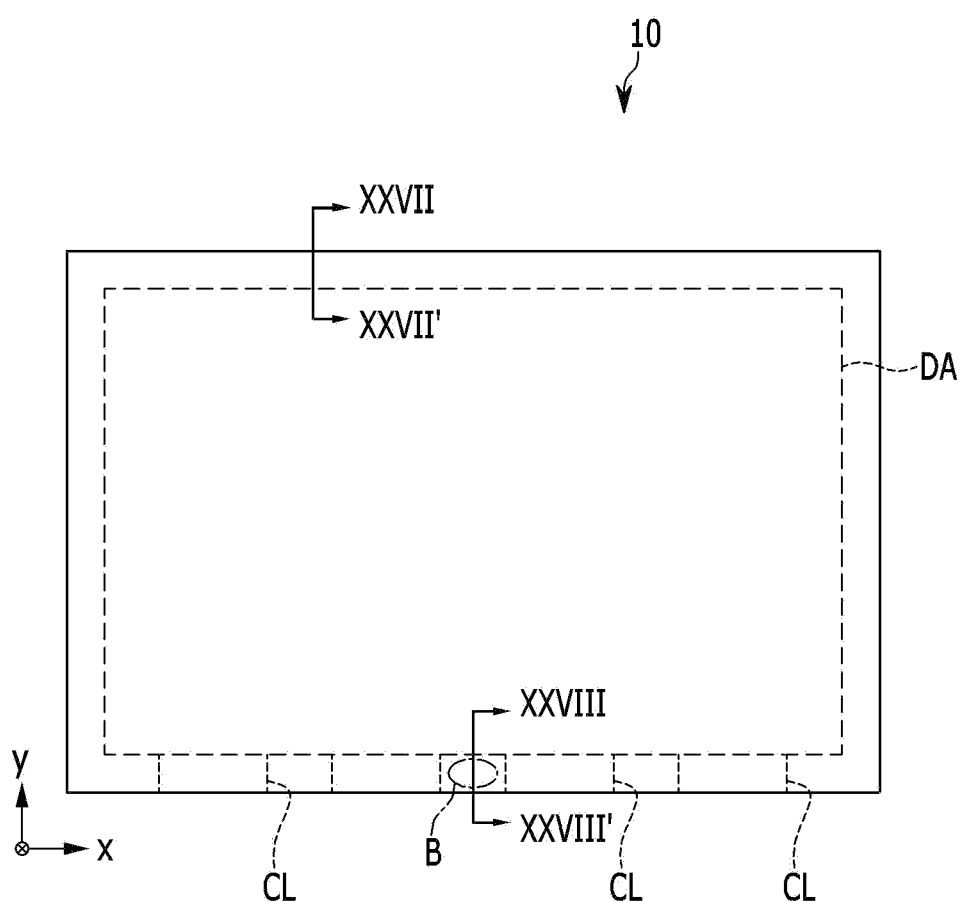
FIG. 25 is a layout view of a liquid crystal display according to another exemplary embodiment of the present invention.
Figure 26:
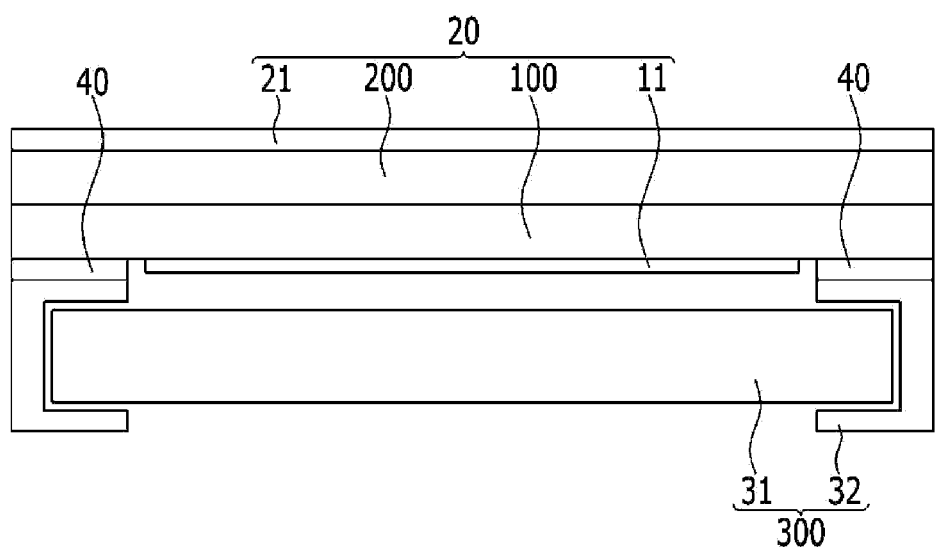
FIG. 26 is a cross-sectional view illustrating the liquid crystal display of FIG. 25 taken along the line XXVI-XXVI'.
Figure 27:
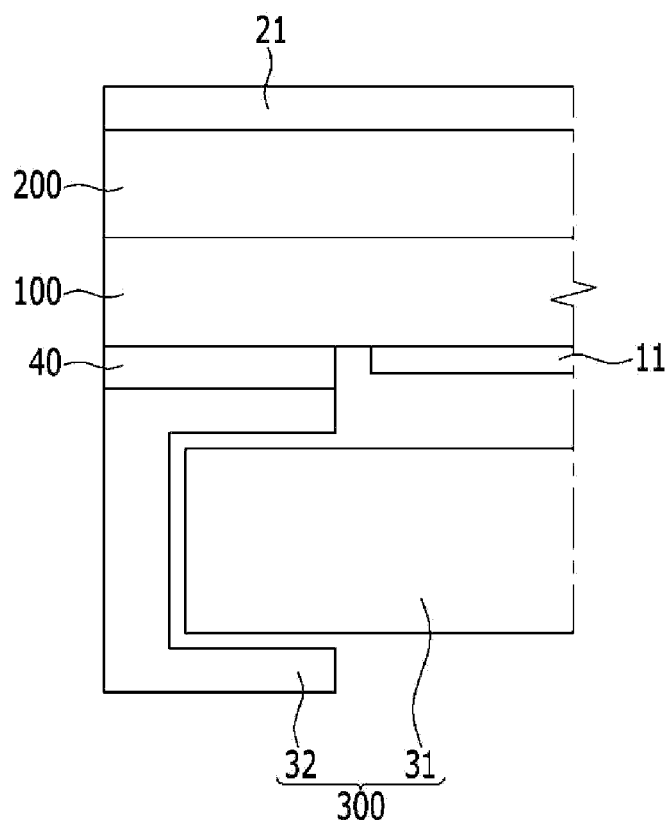
FIG. 27 is a cross-sectional view illustrating the liquid crystal display of FIG. 25 taken along the line XXVII-XXVII'.
Figure 28:
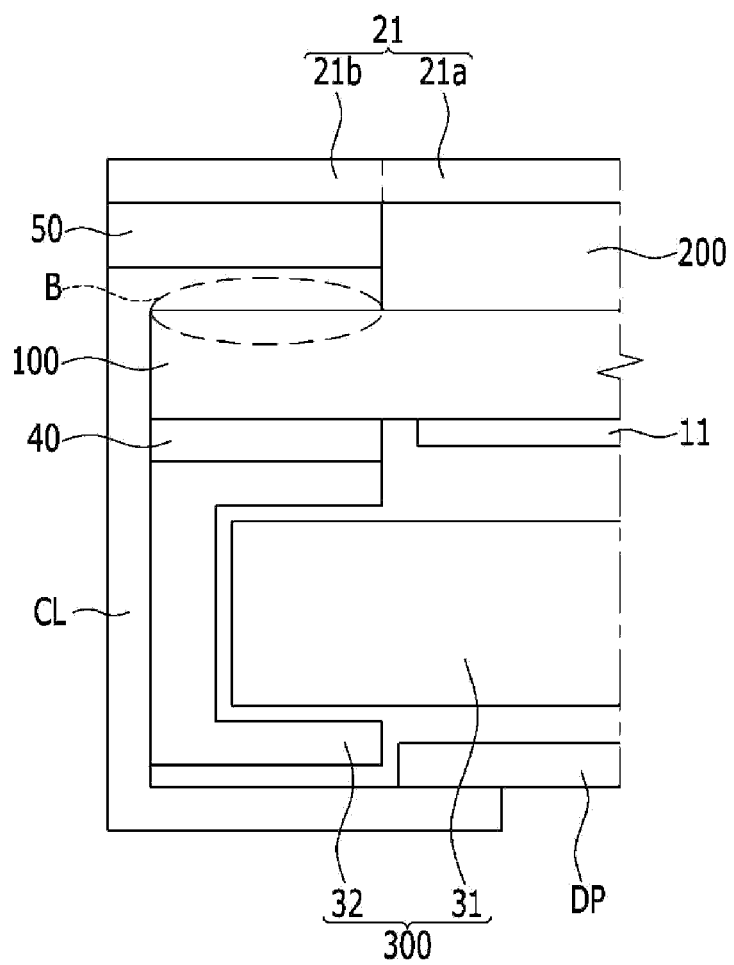
FIG. 28 is a cross-sectional view illustrating the liquid crystal display of FIG. 25 taken along the line XXVIII-XXVIII'.
Figure 29:
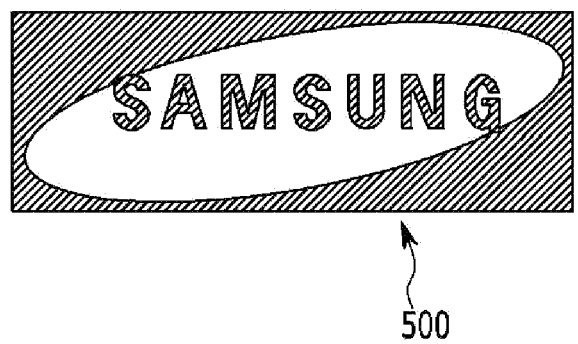
FIG. 29 is a diagram partially illustrating the liquid crystal display of FIG. 25.

Now, a liquid crystal display according to another exemplary embodiment of the present invention will be described with reference to FIGS. 25 to 29. FIG. 25 is a layout view of a liquid crystal display according to another exemplary embodiment of the present invention. FIG. 26 is a cross-sectional view illustrating the liquid crystal display of FIG. 25 taken along the line XXVI-XXVI'. FIG. 27 is a cross-sectional view illustrating the liquid crystal display of FIG. 25 taken along the line XXVII-XXVII'. FIG. 28 is a cross-sectional view illustrating the liquid crystal display of FIG. 25 taken along the line XXVIII-XXVIII'. FIG. 29 is a diagram partially illustrating the liquid crystal display of FIG. 25.

Referring to FIGS. 25 to 28, a liquid crystal display 10 according to an exemplary embodiment of the present invention is similar to the liquid crystal display according to the exemplary embodiment illustrated with reference to FIGS. 1 to 4. Detailed description of the same constituent elements will be omitted.

Referring to FIGS. 25 and 26, a liquid crystal panel 20 includes a first display panel 100 and a second display panel 200, which are disposed opposite to each other and coupled to each other. The liquid crystal panel 20 includes a display area DA in which a plurality of pixels is formed to display an image.

Referring to FIGS. 25, 26, and 27, a second polarizer 21 extends to the ends of both edges of the liquid crystal panel 20 in an X direction and extends to an end of an upper edge of the liquid crystal panel 20 in a Y direction. That is, the second polarizer 21 is formed to extend to the mold frame 32 of the backlight unit 300 and a portion of second polarizer 21 overlaps the adhesive unit 40.

Referring to FIGS. 25 and 28, a driving unit connection line CL is formed at a lower edge of the first display panel 100 of the liquid crystal panel 20 in the Y direction and the external driving circuit portion DP, which is connected to the driving unit connection line CL, is disposed at a back of the backlight unit 300.

The first polarizer 11, which is coupled onto the first display panel 100 adjacent to the backlight unit 300, is not disposed in a region where the adhesive unit 40 is disposed. In contrast, the second polarizer 21, which is coupled to the second display panel 200, is formed in a region that overlaps the adhesive unit 40. Further, the second polarizer 21 is also formed in a region that overlaps the driving unit connection line CL.

The second display panel 200 does not overlap an area near the edge of the first display of the first display panel 100 in which the driving unit connection line CL is formed. That is, a width of the second display panel 200 is smaller than a width of the first display panel 100 in the Y direction and the second display panel 200 is formed so as not to overlap an area near the edge of the first display panel 100 in which the driving unit connection line CL is formed. The edge of the first display panel 100 is exposed and at least a portion of the driving unit connection line CL of the first display panel 100 is exposed through the edge.

A reinforcement unit 50 is disposed at the edge through which the driving unit connection line CL of the first display panel 100 is exposed. The second polarizer 21 is formed on the second display panel 200 and the reinforcement unit 50.

The reinforcement unit 50 compensates for the difference in heights of the portion through which the driving unit connection line CL of the first display panel 100 is exposed and other portions. In this manner, the second polarizer 21 may be coupled not only to the display area DA of the liquid crystal display 10, but also to the front surface of the liquid crystal display 10. That is, the reinforcement unit 50 is formed on a portion of the first display panel 100 which does not overlap the second display panel 200, so that a step between a portion of the first display panel 100 that overlaps the second display panel 200 and the portion which does not overlap the second display panel 200 may be compensated for. Accordingly, heights of surfaces of the second display panel 200 and the reinforcement unit 50 may be substantially the same.

The second polarizer 21 is coupled to the second display panel 200 and the reinforcement unit 50 which have substantially same heights so as to be coupled to the front surface of the liquid crystal display 10.

Referring to FIGS. 28 and 29, in the liquid crystal display according to the present exemplary embodiment, a second portion B, in which a second display portion 500 is formed, is formed in a portion of the first display panel 100. The second polarizer 21 includes a first portion 21a and a second portion 21b, which is different from the liquid crystal display according to the exemplary embodiment illustrated in FIGS. 1 to 4.

The first portion 21a of the second polarizer 21 is a portion where a polarization ink is included and the second portion 21b is a portion where the polarization ink is removed from or not initially included. The second portion 21b of the second polarizer 21 is disposed in a position corresponding to the second portion B of the first display panel 100.

Now, the second portion B of the first display panel 100 will be described with reference to FIG. 29. Referring to FIG. 29, a second display portion 500 which needs to be visible to the user, such as a brand logo, is formed in the second portion B of the first display panel 100.

The second display portion 500 is a portion where a character and a logo which need to be visible to the user, such as a brand logo. The second display portion 500 may be coated with a material such as silver which may reflect the light. In FIG. 29, a portion which may be coated with a material such as silver is represented with diagonal lines.

The polarization ink is not present in the second portion 21b of the second polarizer 21 corresponding to the second portion B of the first display panel 100 in which the second display portion 500 is formed so that the external light is reflected by the material formed in the second display portion 500. Therefore, the second display portion 500 may be visible to the user.

As described above, according to the present exemplary embodiment, the display portion 400, which needs to be visible to the user, such as a brand logo, is formed by partially removing the polarization ink of the polarizer therefrom and coating with the material that reflects the light, such as silver so that the display portion 400 may be visibly recognized by the user without using an additional light source.

Further, in the liquid crystal display according to the exemplary embodiment of the present invention, a chassis unit is not disposed between the liquid crystal panel 20 and the backlight unit 300 which are in contact with each other.

In the liquid crystal display according to the exemplary embodiment of the present invention, the backlight assembly 31 is fixed by the mold frame 32 and then attached to the liquid crystal panel 20 by an adhesive unit 40 so that the liquid crystal panel 20 and the backlight unit 300 are attached to each other without using the top chassis at four edges of the liquid crystal display. In this configuration, the thickness and the weight of the liquid crystal display may be reduced and the width of a bezel portion may be reduced.

Further, the second polarizer 21 is formed on the front surface of the liquid crystal display 10 where the driving unit connection line CL and the external driving circuit portion DP overlap so that the bezel portions are not visible at four edges of the liquid crystal display by a user.

Figure 30:
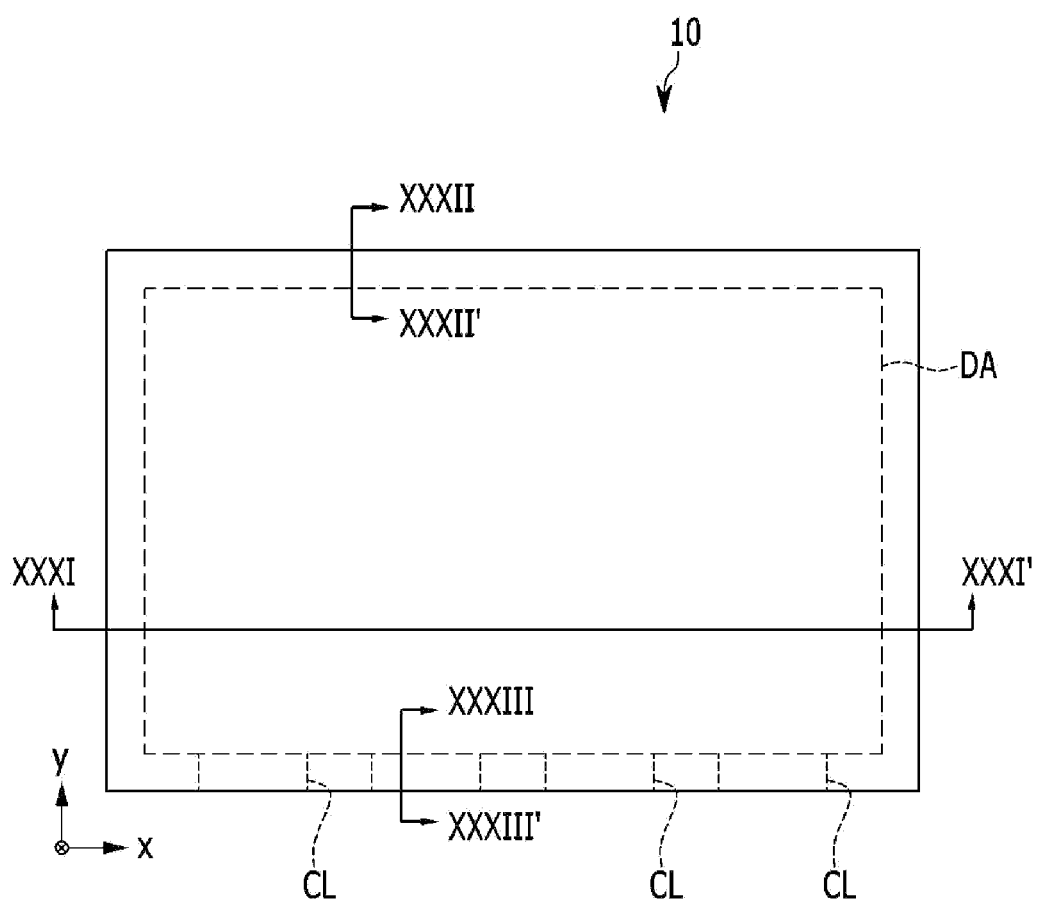
FIG. 30 is a layout view of a liquid crystal display according to another exemplary embodiment of the present invention.
Figure 31:
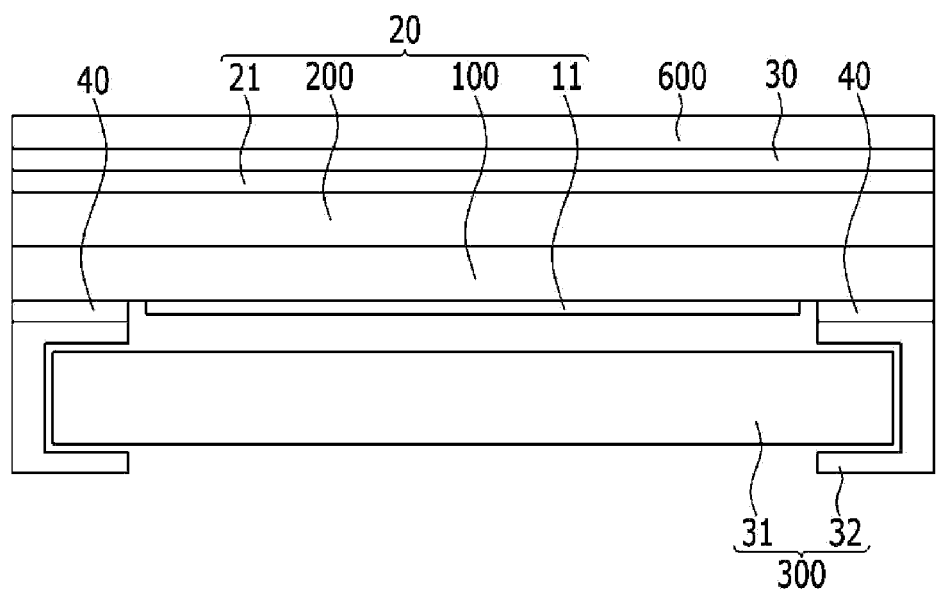
FIG. 31 is a cross-sectional view illustrating the liquid crystal display of FIG. 30 taken along the line XXXI-XXXI'.
Figure 32:
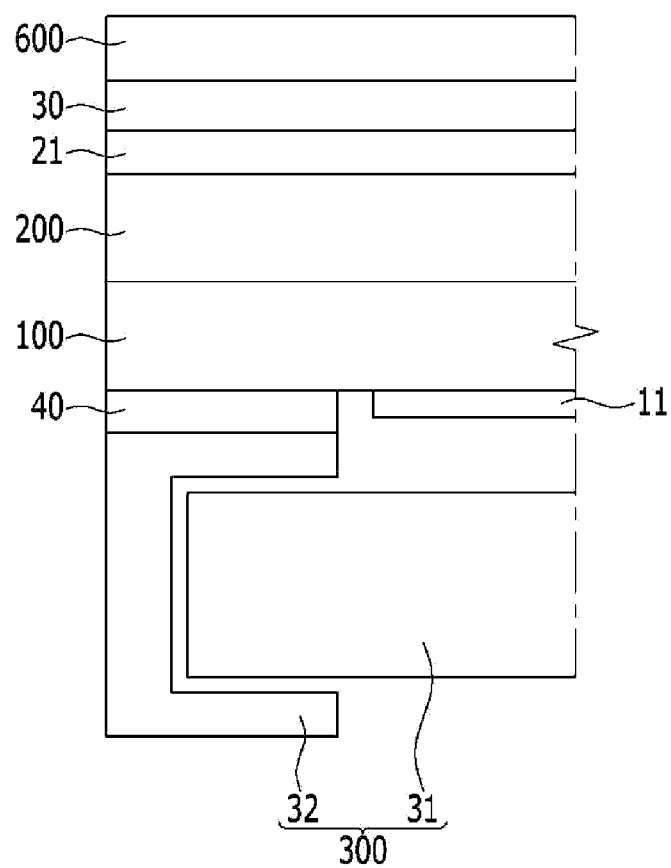
FIG. 32 is a cross-sectional view illustrating the liquid crystal display of FIG. 30 taken along the line XXXII-XXXII'.
Figure 33:
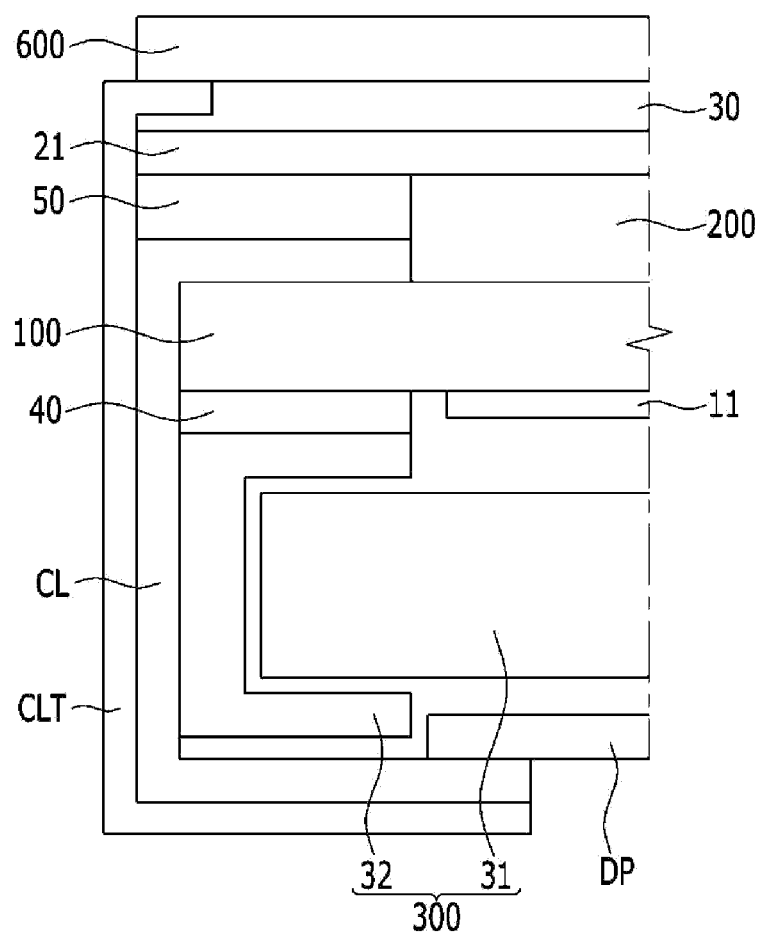
FIG. 33 is a cross-sectional view illustrating the liquid crystal display of FIG. 30 taken along the line XXXIII-XXXIII'.

Now, a liquid crystal display according to another exemplary embodiment of the present invention will be described with reference to FIGS. 30 to 33. FIG. 30 is a layout view of a liquid crystal display according to another exemplary embodiment of the present invention. FIG. 31 is a cross-sectional view illustrating the liquid crystal display of FIG. 30 taken along the line XXXI-XXXI'. FIG. 32 is a cross-sectional view illustrating the liquid crystal display of FIG. 30 taken along the line XXXII-XXXII'. FIG. 33 is a cross-sectional view illustrating the liquid crystal display of FIG. 30 taken along the line XXXIII-XXXIII'.

Referring to FIGS. 30 to 33, a liquid crystal display 10 according to an exemplary embodiment of the present invention is similar to the liquid crystal display according to the exemplary embodiment illustrated with reference to FIGS. 1 to 4. Detailed description of the same constituent elements will be omitted.

Referring to FIGS. 30 and 31, the liquid crystal display includes a liquid crystal panel 20 which includes a display area DA in which a plurality of pixels are formed to display an image and a touch panel 600 which is attached onto the liquid crystal panel 20 by an adhesive layer 30.

Referring to FIGS. 30, 31, and 32, a second polarizer 21 extends to the ends of both edges of the liquid crystal panel 20 in an X direction and extends to an end of an upper edge of the liquid crystal panel 20 in a Y direction. That is, the second polarizer 21 is formed to extend to the mold frame 32 of the backlight unit 300 and has a portion that overlaps the adhesive unit 40. The touch panel 600 extends to the ends of both edges of the liquid crystal panel 20 in an X direction and extends to an end of an upper edge of the liquid crystal panel 20 in a Y direction.

Referring to FIGS. 30 and 33, a driving unit connection line CL is formed at a lower edge of the first display panel 100 of the liquid crystal panel 20 in the Y direction and the external driving circuit portion DP, which is connected to the driving unit connection line CL, is disposed at the back of the backlight unit 300. Similarly, a touch driving unit connection line CLT, which is connected to the touch panel 600, is formed at a lower edge of the first display panel 100 in the Y direction. The touch driving unit connection line CLT may be connected to the driving circuit portion DP which is disposed at the back of the backlight unit 300.

The first polarizer 11, which is disposed on the first display panel 100, adjacent to the backlight unit 300, is not disposed in a region where the adhesive unit 40 is disposed. In contrast, the second polarizer 21 which is coupled to the second display panel 200 is formed in a region that overlaps the adhesive unit 40. Further, the second polarizer 21 is also formed in a region that overlaps the driving unit connection line CL. Further still, the touch panel 600 is also formed in a region that overlaps the driving unit connection line CL.

The second display panel 200 does not overlap an area near the edge of the first display panel 100, in which the driving unit connection line CL is formed. That is, a width of the second display panel 200 is smaller than a width of the first display panel 100 in the Y direction and the second display panel 200 is formed so as not to overlap an area of the edge of the first display panel 100 in which the driving unit connection line CL is formed. The edge of the first display panel 100 is exposed, and at least a portion of the driving unit connection line CL of the first display panel 100 is exposed through the edge.

A reinforcement unit 50 is disposed at the edge through which the driving unit connection line CL of the first display panel 100 is exposed and the second polarizer 21 is disposed on the second display panel 200 and the reinforcement unit 50.

The reinforcement unit 50 compensates for the difference of heights of the portion through which the driving unit connection line CL of the first display panel 100 is exposed and other portions. The second polarizer 21 is coupled not only to the display area DA of the liquid crystal display 10 but also to a front surface of the liquid crystal display 10. That is, the reinforcement unit 50 is formed on a portion of the first display panel 100 which does not overlap the second display panel 200, so that a step between a portion of the first display panel 100 that overlaps the second display panel 200 and the portion which does not overlap the second display panel 200 may be compensated for. Accordingly, heights of surfaces of the second display panel 200 and the reinforcement unit 50 may be substantially the same.

The second polarizer 21 is coupled to the second display panel 200 and the reinforcement unit 50, which have substantially same heights, so as to be coupled to the front surface of the liquid crystal display 10.

As described above, the liquid crystal display according to the present exemplary embodiment further includes the touch panel 600, which is attached to the second polarizer 21 by the adhesive layer 30, which is different from the liquid crystal display according to the exemplary embodiment illustrated in FIGS. 1 to 4. Further, the touch panel 600 is also formed in a region that overlaps the driving unit connection line CL.

As described above, the second polarizer 21 and the touch panel 600 are formed on the front surface of the liquid crystal display 10 where the driving unit connection line CL and the external driving circuit portion DP overlap so that the bezel portions are not visible at the four edges of the liquid crystal display by a user.

Further, according to the exemplary embodiment of the present invention, a chassis unit is not disposed between the liquid crystal panel 20 and the backlight unit 300, which are in contact with each other.

In the liquid crystal display according to the exemplary embodiment of the present invention, the backlight assembly 31 is fixed by the mold frame 32 and then attached to the liquid crystal panel 20 by an adhesive unit 40 so that the liquid crystal panel 20 and the backlight unit 300 are coupled to each other without using the top chassis at four edges of the liquid crystal display. In this configuration, the thickness and the weight of the liquid crystal display may be reduced and the width of a bezel portion may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first display panel and a second display panel disposed facing each other;
a driving unit connection line disposed on the first display panel;
a driving circuit portion electrically connected to the driving unit connection line;
a backlight unit disposed adjacent to the first display panel;
a polarizer disposed on a surface of the second display panel and overlapping the driving unit connection line and the driving circuit portion,
wherein a portion of the driving unit connection line does not overlap the second display panel, and
the polarizer overlaps the portion of the driving unit connection line not overlapping the second display panel.

2. The liquid crystal display of claim 1, further comprising:
a reinforcement unit overlapping the driving unit connection line,
wherein the polarizer is disposed on the reinforcement unit.

3. The liquid crystal display of claim 2, wherein:
the reinforcement unit overlaps the portion of the driving unit connection line not overlapping the second display panel.

4. The liquid crystal display of claim 3, wherein:
a surface of the reinforcement unit is coplanar with a surface of the second display panel.

5. The liquid crystal display of claim 4, wherein:
the reinforcement unit comprises an elastic material.

6. The liquid crystal display of claim 2, wherein:
the reinforcement unit comprises an elastic material.

7. The liquid crystal display of claim 2, wherein:
the backlight unit comprises:
a backlight assembly; and
a mold frame supporting the backlight assembly, and
a chassis unit is not disposed between the backlight unit and the first display panel.

8. The liquid crystal display of claim 1, wherein:
the backlight unit comprises:
backlight assembly, and
a mold frame supporting the backlight assembly, and
no chassis unit is disposed between the backlight unit and the first display panel.

9. The liquid crystal display of claim 8, wherein:
the mold frame comprises an opening,
a portion of light radiated from the backlight assembly is directly transmitted onto a first portion of the first display panel through the opening, and
a first display portion is disposed in the first portion of the first display panel.

10. The liquid crystal display of claim 9, further comprising:
silver disposed on at least a portion of the first display portion.

11. The liquid crystal display of claim 1, wherein:
the polarizer comprises a first region and a second region,
the second region of the polarizer is free of polarization ink,
the second region of the polarizer overlaps a second portion of the first display panel, and
a second display portion is disposed in the second portion of the first display panel.

12. The liquid crystal display of claim 2, further comprising:
silver disposed on at least a portion of the second display portion.

13. The liquid crystal display of claim 1, further comprising:
a touch panel disposed on the polarizer,
wherein the touch panel overlaps the driving unit connection line and the driving circuit portion.

14. A liquid crystal display, comprising:
a first display panel and a second display panel disposed facing each other;
a driving unit connection line disposed on the first display panel;
a driving circuit portion electrically connected to the driving unit connection line;
a backlight unit disposed adjacent to the second display panel; and
a polarizer disposed on a surface of the first display panel and overlapping the driving unit connection line and the driving circuit portion,
wherein a portion of the driving unit connection line does not overlap the second display panel, and
the polarizer overlaps the portion of the driving unit connection line not overlapping the second display panel.

15. The liquid crystal display of claim 14, further comprising:
a reinforcement unit overlapping the driving unit connection line,
wherein the polarizer is disposed on the reinforcement unit.

16. The liquid crystal display of claim 15, wherein:
the backlight unit comprises:
a backlight assembly; and
a mold frame supporting the backlight assembly, and
no chassis unit is disposed between the backlight unit and the first display panel.

17. The liquid crystal display of claim 14, wherein:
the backlight unit comprises:
a backlight assembly; and
a mold frame supporting the backlight assembly, and
no chassis unit is disposed between the backlight unit and the first display panel.

18. A manufacturing method of a liquid crystal display, comprising:
forming a first display panel and a second display panel, the first display panel comprising a signal line formed in a pixel region, a driving unit connection line electrically connected to the signal line, and a driving circuit portion connected to the driving unit connection line;
forming a first polarizer on a surface of the first display panel;
coupling the first display panel and a backlight unit to each other;
washing the second display panel; and
forming a second polarizer on the second display panel,
wherein the second polarizer is formed so as to overlap the driving unit connection line and the driving circuit portion,
wherein the forming of the first display panel and the second display panel comprises forming a portion of the driving unit connection line so as not to overlap the second display panel, and
wherein the forming of the second polarizer comprising forming the second polarizer so as to overlap the portion of the driving unit connection line not overlapping the second display panel.

19. The manufacturing method of claim 18, further comprising:
forming a reinforcement unit overlapping the driving unit connection line,
wherein the forming of the second polarizer comprises disposing the second polarizer on the second display panel and the reinforcement unit.

20. The manufacturing method of claim 19, wherein:
the forming of the reinforcement unit comprises forming the reinforcement unit so as to overlap the portion of the driving unit connection line that does not overlap the second display panel.

21. The manufacturing method of claim 20, wherein:
a surface of the reinforcement unit is coplanar with a surface of the second display panel.

22. The manufacturing method of claim 21, wherein:
the reinforcement unit comprises an elastic material.

23. The manufacturing method of claim 19, wherein:
the reinforcement unit comprises an elastic material.

24. The manufacturing method of claim 19, wherein:
a chassis unit is not disposed between the backlight unit and the first display panel.

25. The manufacturing method of claim 18, wherein:
a chassis unit is not disposed between the backlight unit and the first display panel.

* * * * *